United States Patent [19]

Suzuki et al.

[11] Patent Number: 6,088,383
[45] Date of Patent: Jul. 11, 2000

[54] SPREAD-SPECTRUM SIGNAL DEMODULATOR

[75] Inventors: Toshinori Suzuki, Tokyo; Yoshio Takeuchi, Saitama, both of Japan

[73] Assignee: Kokusai Denshin Denwa Kabushiki Kaisha, Tokyo, Japan

[21] Appl. No.: 08/952,342

[22] PCT Filed: Mar. 5, 1997

[86] PCT No.: PCT/JP97/00679

§ 371 Date: Oct. 15, 1997

§ 102(e) Date: Oct. 15, 1997

[87] PCT Pub. No.: WO97/33401

PCT Pub. Date: Sep. 12, 1997

[30] Foreign Application Priority Data

Mar. 7, 1996 [JP] Japan .................................. 8-078171

[51] Int. Cl.[7] .................................................. H04B 15/00
[52] U.S. Cl. ........................ 375/148; 375/144; 375/147; 375/152; 375/346
[58] Field of Search .................................... 375/346, 349, 375/152, 148, 285, 144, 147; 370/342, 479

[56] References Cited

U.S. PATENT DOCUMENTS

| | | | |
|---|---|---|---|
| 5,467,368 | 11/1995 | Takeuchi et al. | 375/206 |
| 5,553,062 | 9/1996 | Schilling et al. | 370/479 |
| 5,740,208 | 4/1998 | Hulbert et al. | 375/346 |
| 5,812,546 | 9/1998 | Zhou et al. | 370/342 |
| 5,898,740 | 4/1999 | Laakso et al. | 375/346 |

FOREIGN PATENT DOCUMENTS

| | | |
|---|---|---|
| 7-212274 | 8/1995 | Japan . |
| 7-264112 | 10/1995 | Japan . |
| 7-273713 | 10/1995 | Japan . |

OTHER PUBLICATIONS

"Near–Far Resistance of Multiuser Detectors in Asynchronous Channels", R. Lupas et al., IEEE Transactions on Communications, vol. 38, No. 4, pp. 496–508, Apr. 1990.

"Multiuser Detection for CDMA Systems", A. Duel–Hallen et al., IEEE Personal Communications, pp. 46–58, Apr. 1995.

"A spread–Spectrum Multi–Access System with a Cascade of Co–Channel Interference Cancellers for Multipath Fading Channels", Y. Yoon et al., IEEE Second International Symposium on Spread Spectrum Techniques and Applications, Nov. 29–Dec. 2, 1992, pp. 87–90.

Primary Examiner—Stephen Chin
Assistant Examiner—Shuwany Liu
Attorney, Agent, or Firm—Westman, Champlin & Kelly, P.A.

[57] ABSTRACT

A spread spectrum signal demodulator receives a received signal including a plurality of spread spectrum signals, and comprises at least one signal strength suppressing means, which reduces a correlation signal outputted from a first correlation detecting means or replica signals until the correlation signal has been traveled through a replica signal generating means, a replica signal subtracting means and a second correlation detecting means. According to the invention, it is possible to improve interference cancellation capacity with a computational effort substantially comparable to that in a prior art replica signal cancellation system and improve interference cancellation performance with increasing number of interference cancellers irrespective of the magnitude of the correlation. With a sufficient number of interference cancellers provided, it is possible to obtain the same effect as obtainable with prior art decorrelation in a real time processing irrespective of the correlation magnitude.

18 Claims, 18 Drawing Sheets

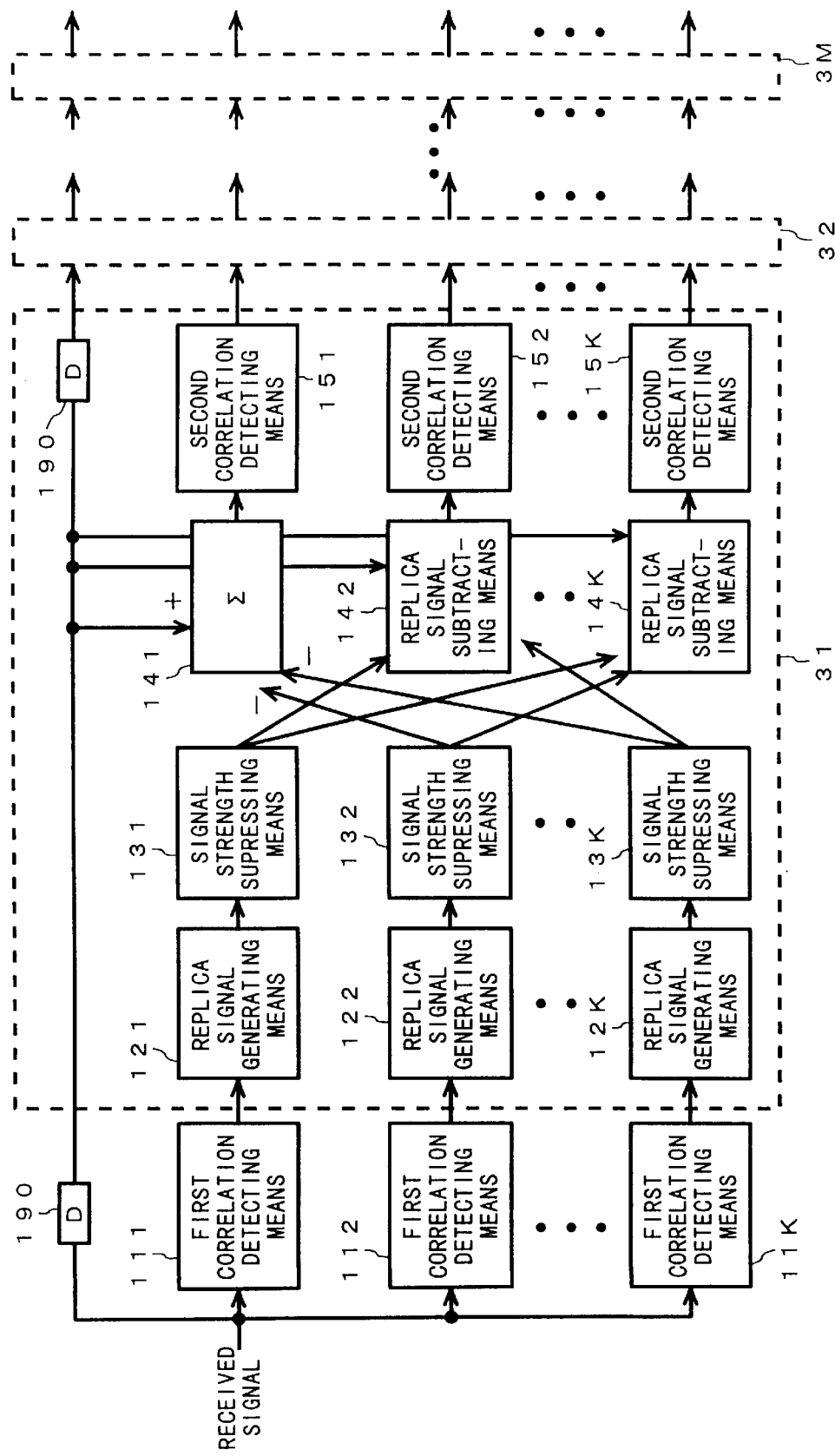

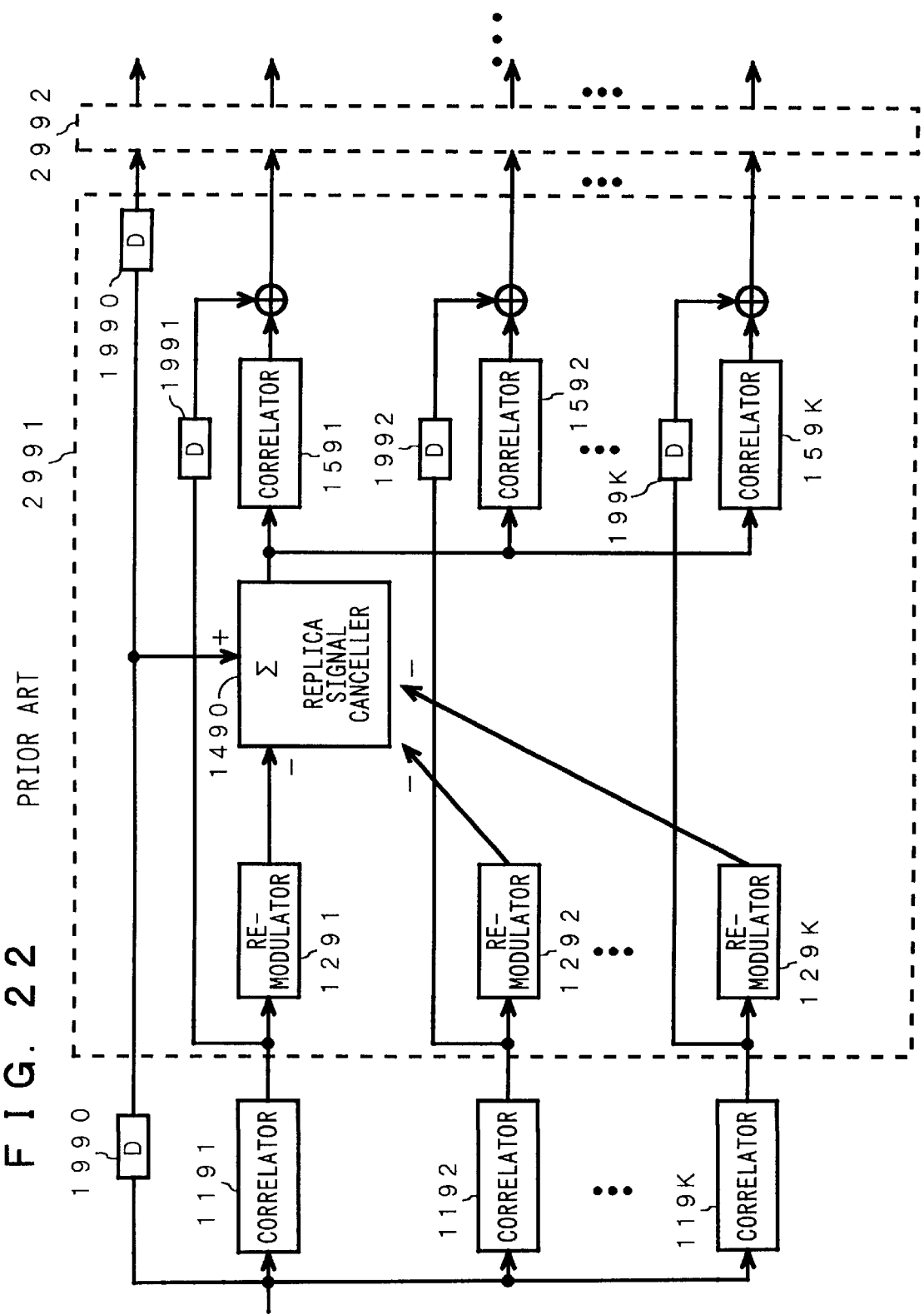

FIG. 23
PRIOR ART

FORMULA (1):
$$r = a_1 d_1 \bar{c}_1 + a_2 d_2 \bar{c}_2 + \cdots + a_K d_K \bar{c}_K + n$$
$$= \sum_{k=1}^{K} a_k d_k \bar{c}_k + n$$

FORMULA (2):
$$d_k \bar{c}_k \hat{c}_k = z d_k$$

FORMULA (3):
$$\hat{d}_k = r \hat{c}_k$$
$$= z a_k d_k + (\sum_{i \neq k}^{K} a_i d_i \bar{c}_i + n) \hat{c}_k$$

FORMULA (4):
$$\hat{\mathbf{d}} = \begin{pmatrix} \hat{d}_1 & \hat{d}_2 & \cdots & \hat{d}_K \end{pmatrix}$$
$$= r \hat{\mathbf{c}}$$
$$= r \begin{pmatrix} \hat{c}_1 & \hat{c}_2 & \cdots & \hat{c}_K \end{pmatrix}$$
$$= \mathbf{Ad} \cdot \tilde{\mathbf{C}} + n \hat{\mathbf{c}}$$
$$\mathbf{A}^t = \begin{pmatrix} a_1 & a_2 & \cdots & a_K \end{pmatrix}$$
$$\mathbf{d} = \begin{pmatrix} d_1 & d_2 & \cdots & d_K \end{pmatrix}$$
$$\tilde{\mathbf{C}} = \begin{pmatrix} z & \bar{c}_1 \hat{c}_2 & \cdots & \bar{c}_1 \hat{c}_K \\ \bar{c}_2 \hat{c}_1 & z & & \vdots \\ \vdots & & \ddots & \bar{c}_{K-1} \hat{c}_K \\ \bar{c}_K \hat{c}_1 & \bar{c}_K \hat{c}_2 & \cdots & z \end{pmatrix}$$

FORMULA (5):
$$\hat{\mathbf{d}} = \mathbf{Ad} \cdot \mathbf{C} + n \hat{\mathbf{c}}$$
$$\mathbf{C} = z \begin{pmatrix} 1 & c_{1,2} & \cdots & c_{1,K} \\ c_{2,1} & 1 & & \vdots \\ \vdots & & \ddots & c_{K-1,K} \\ c_{K,1} & c_{K,2} & \cdots & 1 \end{pmatrix}$$

FORMULA (6):
$$\hat{\mathbf{d}}^{(\sim)} = \hat{\mathbf{d}} \cdot \mathbf{C}^{-1}$$

FORMULA (7):
$$\hat{\mathbf{d}}^{(\sim)} = \mathbf{Ad} + n \hat{\mathbf{c}} \cdot \mathbf{C}^{-1}$$

FIG. 24
PRIOR ART

FORMULA (8):
$$\hat{d}_k \bar{c}_k$$

FORMULA (9):
$$zr - \sum_{k=1}^{K} \hat{d}_k \bar{c}_k$$

FORMULA (10):
$$\hat{d}_k^{(1)} = z\hat{d}_k + \left(zr - \sum_{j=1}^{K} \hat{d}_j \bar{c}_j\right)\hat{c}_k$$
$$= z\hat{d}_k + z\hat{d}_k - \sum_{j=1}^{K} \hat{d}_j \bar{c}_j \hat{c}_k$$
$$= z\hat{d}_k - \sum_{j \neq k}^{K} \hat{d}_j \bar{c}_j \hat{c}_k$$

FORMULA (11):
$$\hat{\mathbf{d}}^{(1)} = \begin{pmatrix} \hat{d}_1^{(1)} & \hat{d}_2^{(1)} & \cdots & \hat{d}_K^{(1)} \end{pmatrix}$$
$$= z\hat{\mathbf{d}} + \hat{\mathbf{d}} \cdot (z\mathbf{I} - \tilde{\mathbf{C}})$$

FORMULA (12):
$$\hat{\mathbf{d}}^{(M)} = z^M \hat{\mathbf{d}} + z^{M-1} \hat{\mathbf{d}} \cdot (z\mathbf{I} - \tilde{\mathbf{C}}) + \cdots + \hat{\mathbf{d}} \cdot (z\mathbf{I} - \tilde{\mathbf{C}})^M$$

FORMULA (13):
$$\hat{\mathbf{d}} = \mathbf{A}\mathbf{d} \cdot (z\mathbf{I} - (z\mathbf{I} - \tilde{\mathbf{C}})) + n\hat{\mathbf{c}}$$

FORMULA (14):
$$\hat{\mathbf{d}}^{(M)} = z^{M+1} \mathbf{A}\mathbf{d} - \mathbf{A}\mathbf{d} \cdot (z\mathbf{I} - \tilde{\mathbf{C}})^{M+1} + \sum_{m=0}^{M} z^{M-m} n\hat{\mathbf{c}}(z\mathbf{I} - \tilde{\mathbf{C}})^m$$

FORMULA (15):
$$\lim_{M \to \infty} (\mathbf{I} - \mathbf{C})^M \to 0$$

FORMULA (16):
$$zr - s\sum_{k=1}^{K} \hat{d}_k \bar{c}_k$$

FORMULA (17):
$$\hat{d}_k^{(1)} = z\hat{d}_k + \left(zr - s\sum_{j=1}^{K} \hat{d}_j \bar{c}_j\right)\hat{c}_k$$
$$= z\hat{d}_k + z\hat{d}_k - s\sum_{j=1}^{K} \hat{d}_j \bar{c}_j \hat{c}_k$$
$$= z\hat{d}_k + (1-s)z\hat{d}_k - s\sum_{j \neq k}^{K} \hat{d}_j \bar{c}_j \hat{c}_k$$

FIG. 25

FORMULA (18):
$$\hat{\mathbf{d}}^{(1)} = \begin{pmatrix} \hat{d}_1^{(1)} & \hat{d}_2^{(1)} & \cdots & \hat{d}_K^{(1)} \end{pmatrix}$$
$$= z\hat{\mathbf{d}} + \hat{\mathbf{d}} \cdot \left(z\mathbf{I} - s\tilde{\mathbf{C}}\right)$$

FORMULA (19):
$$\hat{\mathbf{d}}^{(M)} = z^M \hat{\mathbf{d}} + z^{M-1} \hat{\mathbf{d}} \cdot \left(z\mathbf{I} - s\tilde{\mathbf{C}}\right) + \cdots + \hat{\mathbf{d}} \cdot \left(z\mathbf{I} - s\tilde{\mathbf{C}}\right)^M$$

FORMULA (20):
$$\hat{\mathbf{d}} = \mathbf{A}\mathbf{d} \cdot \left(z\mathbf{I} - \left(z\mathbf{I} - s\tilde{\mathbf{C}}\right)\right)\frac{1}{s} + n\hat{\mathbf{c}}$$

FORMULA (21):
$$\hat{\mathbf{d}}^{(M)} = z^{M+1}\mathbf{A}\mathbf{d}\frac{1}{s} - \mathbf{A}\mathbf{d} \cdot \left(z\mathbf{I} - s\tilde{\mathbf{C}}\right)^{M+1}\frac{1}{s} + \sum_{m=0}^{M} z^{M-m} n\hat{\mathbf{c}} \left(z\mathbf{I} - s\tilde{\mathbf{C}}\right)^m$$

FORMULA (22):
$$\lim_{M \to \infty} (\mathbf{I} - s\mathbf{C})^M \to 0$$

FORMULA (23):
$$\mathbf{C} = \mathbf{X} \begin{pmatrix} \alpha_1 & 0 & \cdots & 0 \\ 0 & \alpha_2 & & \vdots \\ \vdots & & \ddots & 0 \\ 0 & \cdots & 0 & \alpha_K \end{pmatrix} \mathbf{X}^{-1}$$

FORMULA (24):
$$(\mathbf{I} - s\mathbf{C})^M = \mathbf{X} \begin{pmatrix} (1-s\alpha_1)^M & 0 & \cdots & 0 \\ 0 & (1-s\alpha_2)^M & & \vdots \\ \vdots & & \ddots & 0 \\ 0 & \cdots & 0 & (1-s\alpha_K)^M \end{pmatrix} \mathbf{X}^{-1}$$

FORMULA (25):
$$\max_i |1 - s\alpha_i| < 1$$

FORMULA (26):
$$\hat{\mathbf{d}}^{(M)} = z^{M+1}\mathbf{A}\mathbf{d} - \mathbf{A}\mathbf{d} \cdot \left(z\mathbf{I} - s\tilde{\mathbf{C}}\right)^{M+1} + s\sum_{m}^{M} z^{M-m} n\hat{\mathbf{c}} \left(z\mathbf{I} - s\tilde{\mathbf{C}}\right)^m$$

SPREAD-SPECTRUM SIGNAL DEMODULATOR

TECHNICAL FIELD

This invention relates to spread spectrum signal demodulators and, more particularly, to spread spectrum signal demodulators used for cellular communication systems, indoor wireless communication systems, wireless LAN (local are network) systems, etc.

BACKGROUND ART

Systems dealing with spread spectrum signals for code division multiple access (CDMA), in which a plurality of signals are transmitted in the same band, are subject to inter-signal interference that is generated in dependence on the correlation among codes assigned to individual signals. The characteristics or quality of the signals are deteriorated increasingly with increasing number of signals involved. In addition, signal level fluctuations result in increased interference of higher level signals on lower level signals, thus greatly reducing the characteristics of the lower level signals.

Some methods for improving signal characteristics by reducing such inter-signal interference have been proposed. One such method is realized by a system called decorrelation system. In this system, decorrelation is made by using known code correlations. FIG. 19 shows an example of the circuit construction which realizes this system. Referring to the figure, designated at 1001 to 100K are correlators, and at 101 is a decorrelator.

As a spectrum spreading scheme, a direct sequence (DS) system is assumed. A received signal r is expressed by formula (1) in FIG. 23.

In the formula (1), K represents the number of simultaneously transmitted signals, dk a k-th (k=1, 2, . . . , K) transmitted symbol, $C_k$ the spreading code of a k-th signal, $\bar{c}_k$ a despreading operation caused by spreading code $c_k$, n background noise introduced into signal on the transmission line, and $a_k$ a reception level.

The rule of formula (2) in the same figure is met when the despreading operation $\bar{c}_k$ and the correlating operation $\hat{c}_k$ are synchronized to each other.

The correlating operation $\hat{c}_k$ is completed after one symbol has been transmitted, and this is expressed by the provision of a delay element z for one symbol.

With the received signal r, the k-th correlator 100K provides an output $\hat{d}_k$, which is given by formula (3) in the same figure.

Formula (4) in the same figure is a vector expression of all the signals to be demodulated in a single form. In the formula (4), $\tilde{C}$ is a matrix type operator corresponding to a correlation matrix.

For the sake of brevity, it is assumed that the symbol timings of the signals are synchronized, and denoting the correlation between signals i (i=1, 2, . . . , K) and signals j (j=1, 2, . . . , K) by ci,j (ci, i=1, |ci, j|≦1) we can use formula (5) in the same figure, where the matrix C of the elements ci, j represents the correlation of signals.

The decorrelator 101 obtains an inverse matrix ($C^{-1}$) to the correlation matrix C, and executes matrix multiplification on the outputs of the correlators 1001 to 100K as in formula (6) in the same figure.

Since the spreading codes of the individual signals are known, the elements ci,j of the correlation matrix C can be calculated in advance, and the inverse matrix ($C^{-1}$) can be obtained in advance.

It will be seen that by substituting the formula (5) into the formula (6) the signal $\hat{d}^{(\infty)}$ obtained by the above decorrelation can be expressed by formula (7) in the same figure.

This means that the decorrelated signal $\hat{d}^{(\infty)}$ comprises the product of the reception level A of the original signal and the transmitted symbol d and noise component n that is introduced, and is not affected by the other signals that are simultaneously received. In other words, it is meant that inter-signal interference is cancelled, and that interference cancelled detected signals (or detected signals with cancelled interference) can be obtained. The interference cancelled detected signals can be demodulated through phase synchronization, for instance, and bit determination.

While the operation of the decorrelation system in the case of presence of symbol synchronization has been shown, in the case of absence of the symbol synchronization (asynchronous case) the decorrelation is obtainable as well, as shown in "Near-Far Resistance of Multiuser Detectors in Asynchronous Channels" (E. Lupas S. Verdu, IEEE Trans. Com. Vol. 38, No. 4, April 1990). Denoting the number of symbols transmitted in a sufficiently long time by L, it can be considered that LK synchronized signals are transmitted during this time. This means that the decorrelation in the asynchronous case can be attained by dealing with the correlation matrix C having a magnitude of LK×LK.

In the decorrelation system, a change in the number of signals causes a change in the size of the correlation matrix C, thus making it necessary to compute again the inverse matrix ($C^{-1}$) used for the decorrelation process. In other words, in such case as when signals are frequently turned on and off by voice activation or the like or when delay times are changed quickly in mobile communication, the inverse matrix computation should be made in a very short period of time.

The inverse matrix computation generally requires a computational effort which is proportional to the cube of the matrix size. Specifically, the computational effort is proportional to about the cube of K in the case of presence of the symbol synchronization and to about the cube of LK in the asynchronous case. This means that it is difficult to make the inverse matrix computation on the real time basis.

Aside from the decorrelation system, a replica signal cancellation system has been proposed as another system for improving signal characteristics by cancelling inter-signal interference. In this system, replica signals of individual signals are produced and subtracted from the originally received signal for the interference reduction. The replica signals of the individual signals may be subtracted either one by one (serial system) or collectively (parallel system) from the original signal in FIGS. 20 and 21 show examples of the constructions of the serial system (or also called successive system) and the parallel system, respectively.

The illustrated systems are for the case where the number of signals is K. Re-modulators 1291 to 129K generate replica signals by re-spreading symbols detected in correlators 1191 to 119K. Replica signal cancellers 1491 to 149K subtract the replica signals of the other stations either one by one or collectively from the original signal (i.e., received signal), and correlators 1591 to 159K again detect symbols. The interference cancellers 2791, 2792 and also the interference cancellers 2891, 2892 are identical or alike in construction. A plurality of such interference cancellers are connected such as to iteratedly carry out signal processing with the re-modulators, replica signal cancellers and correlators shown above. In either of the above systems (i.e., serial and parallel systems), the replica signals are generated either by a method, in which the symbols detected by the correlators are re-spreaded while holding their intensity (soft decision basis), or by a method, in which the symbols detected by the correlators are once subjected to bit determination (hard decision basis), then re-spreaded, and then multiplied by the reception levels of the individual signals to restore the signal intensity.

The serial system has a problem that the signal first demodulated by the correlator 1191 is not interference cancelled. To avoid this problem, a method is adopted, in which the highest intensity signal is demodulated first, and the lowest intensity signal is demodulated finally, thereby improving the overall demodulation performance. Where no means for detecting the intensity of the individual signals is provided, the signals are ranked with respect to some reference by using some substitute means, and the demodulation order is determined according to this ranking. However, such a scheme where the demodulation order is varied in dependence on the ranking, is subject to circuit scale increases, that is, subject to new structural problems that are posed when structural problems are to be solved.

The parallel system is superior in the interference cancellation property to the serial system in the case where the reception intensity levels of the individual signals are equal or close to one another. In the case where the individual signal intensity levels vary greatly under fading circumstances or due to the near-far problem, however, the serial system is superior in the interference cancellation property. These technical affairs are detailed in A. Duel-Hallen, J. Holtzman, and Z. Zvonar, "Multiuser Detection for CDMA System", IEEE Personal Communications, April 1995. The parallel system has a further problem that when the ratio between the number K of signals to be demodulated and the spreading factor exceeds a certain value, the demodulation performance is rather deteriorated with increasing number of interference canceller stages. Due to this problem, only demodulation performance in cases where the ratio of the number K of signals to be demodulated and the spreading factor is at most around 0.5 and also the interference cancellation is done in a double of stages, are reported in prior art literatures. For example, according to the above literature the interference cancellation is done in up to two stages, and according to Y. Yoon, R. Kohno et al, "A Spread-Spectrum Multi-Access System with a Co-Channel Interference Canceller for Multipath Fading Channels", IEEE JSAC December 1993, it is up to three stages.

An interference canceller proposed in Japanese Laid-Open Patent Publication No. 7-131382 (U.S. Pat. No. 5,467,368) is a parallel system variety, which is realized with a construction as shown in FIG. 22. Referring to the figure, re-modulators 1291 to 129K generate replica signals by re-spreading symbols detected by correlators 1191 to 119K. A replica signal canceller 1490 collectively subtracts all the replica signals from the originally received signal. Symbols detected by correlators 1591 to 159K are added to symbols detected again by the correlators 1191 to 119K. The interference cancellers 2991, 2992, . . . are identical or alike in construction.

The operation of the above system shown in FIG. 22 will now be described. Since each of the outputs of the correlators 119k (k=1, 2, . . . K) is given by the formula (3), a k-th replica signal obtained from the re-modulator 129k is as given by formula (8) in FIG. 24.

The replica signal canceller 1490 which subtracts all the replica signals from the received signal, provides a signal as given by formula (9) in the same figure.

The output signal of the replica signal canceller 1490 is inputted to the correlators 1591 to 159K, which take the correlations between the individual input signals and the corresponding spreading codes. Then, the symbols detected by the correlators 1191 to 119K are added to the symbols detected by the correlators 1591 to 159K. Each resultant sum symbol $\hat{d}_k^{(1)}$, i.e., k-th output symbol from the interference canceller 2991, can be expressed by formula (10) in the same figure.

Using vector expression for only K signals, the above formula is reduced to formula (11) in the same figure.

In the formula (11), I represents an identity matrix.

When the process in the re-modulators 1291 to 129K through the correlators 1591 to 159K is executed iteratedly M times, a signal $\hat{d}^{(M)}$ given by formula (12) in the same figure is obtained.

On the right side of the formula (12), $\hat{d}$ represents the signal detected by the correlators 1191 to 119K, and is given by the formula (4). The formula (4) can be replaced with formula (13).

By substituting the formula (13) into the formula (12), it will be seen that the signal $\hat{d}^{(M)}$ obtained in the case (where M interference canceller stages are provided) is given by formula (14) in the same figure.

In the above formula, the right side first term represents the product of the reception level A of the original signal and the transmitted symbol d, that is, a desired signal component to be detected. The second term on the same side represents a value which raises the correlation matrix to the Mth power (M is the number of interference canceller stages), that is, a residual interference component. This indicates that provided the correlation matrix C meets the condition of formula (15) in the same figure, the interference component is reduced with increasing number of interference canceller stages.

An extraction way of symbol timings of signals to be demodulated will be described as follows. Correlations of received signal without being interference cancelled and spreading codes assigned to individual spread spectrum signals are detected using matched filters, and the symbol timings are determined according to the detected peak timings.

Utilizing the effect of the interference cancellation to improve the link quality, permits accommodating many signals in the same band until a constant quality is met. By increasing the number of signals capable of being accommodated by having resort to the interference cancellation effect, however, the magnitude of the cross-correlation is increased to deteriorate the accuracy of the symbol timings extracted from the received signal. In other words, replica signals which are generated according to symbol timings of reduced accuracy, are erroneous and disable normal interference cancellation, thus deteriorating the demodulation performance. Symbol timing extraction methods which are based on such interference cancellation have been hardly investigated.

The decorrelation system, on the other hand, permits perfectly interference cancelled detected signals to be obtained as described before. However, the system requires inverse matrix computation of a correlation matrix whose size is very large, the computation requiring enormous computational effort and being difficult to realize on real time.

The replica signal cancellation in the prior art, can be realized with far less processing effort compared to the decorrelation.

This method, however, is directly affected by correlation between spreading codes. That is, influence of interference signal appears in the output of the correlator 119K, so that the replica signal generated by the re-modulator 129K contains an error due to the influence of the interference. The error is accumulated as the replica signal cancellation is repeated, and eventually exceeds the desired signal power to be detected. It will be seen that a limitation is imposed on the interference cancellation capacity, and continuously increasing the number of interference canceller stages eventually results in demodulation performance deterioration.

The interference cancellation system proposed in the Japanese Laid-Open Patent Publication No. 7-131382 (U.S. Pat. No. 5,467,368) is a sort of replica signal cancellation system, in which a plurality of replica signals are generated in parallel for cancellation from the original received signal. When soft decision is adopted to generate the replica signals, the resultant output signal is close to that in the decorrelation system. In other words, excellent performance can be ensured with the same order of processing effort as in the replica signal cancellation system.

Again in this system, however, under a particular condition replica signal errors due to correlation between spreading codes are accumulated with increasing number of stages and eventually exceed the desired signal power to be detected. The condition is governed by the correlation received by a signal from a (K−1)-th signal. For example, with a correlation magnitude of about 0.5, the mean performance is slightly improved up to the third stage, but with further stage number increase it turns to be deteriorated and is eventually sharply deteriorated.

DISCLOSURE OF INVENTION

The invention seeks to solve the problems inherent in the prior art as discussed above. Specifically, the invention has an object of providing a spread spectrum signal demodulator, which permits great interference cancellation capacity improvement by merely slightly increasing the processing effort compared to the prior art replica signal cancellation system.

Another object of the invention is to provide a spread spectrum signal demodulator, which seeks to solve the problem inherent in the system proposed in the Japanese Laid-Open Patent Publication No. 7-131382 (U.S. Pat. No. 5,467,368), and can provide as close demodulation performance to that in the decorrelation system as desired by increasing the number of interference cancellers irrespective of the correlation magnitude.

A further object of the invention is to provide a spread spectrum signal demodulator, which permits improving the symbol timing extraction accuracy which has not been taken into considerations in the prior art interference cancellation system.

The invention features a spread spectrum signal demodulator receiving a received signal including a plurality of spread spectrum signals, which comprises at least one first correlation detecting means for detecting correlations between spreading codes assigned to the respective spread spectrum signals contained in the received signal and the received signal, and a plurality of interference cancellers connected one after another and each including at least one replica signal generating means for generating replicas of the respective spread spectrum signals contained in the received signal by causing re-spreading of the correlations detected by the first correlation detecting means in timed relation to respective symbol timings with the spreading codes, at least one replica signal subtracting means for subtracting replica signals generated in the replica signal generating means from the received signal, at least one second correlation detecting means for detecting correlations between a received signal after replica signal cancellation obtained from the replica signal subtracting means and the spreading codes assigned to the respective spread spectrum signals contained in the received signal, and at least one signal strength suppressing means for reducing at least once the strength of an intermediate signal generated until a correlation signal from the first correlation signal detecting means has traveled through the replica signal generating means, the replica signal subtracting means and the second correlation detecting means.

According to the invention, it is possible to provide a spread spectrum signal demodulator, which permits greatly improving the interference cancellation capacity and providing as close deomdulation performance to that in the decorrelation system by increasing the number of interference cancellers.

BRIEF DESCRIPTION OF DRAWINGS

FIG. 10 is a block diagram showing the circuit construction of a second embodiment of the invention;

FIG. 22 is a block diagram showing the circuit construction of an interference cancellation system shown in Japanese Laid-Open Patent Publication No. 7-131382;

FIG. 23 is a view showing mathematical formulas involved in the description of the operation of prior art systems;

FIG. 24 is a view showing mathematical formulas involved in the description of the operation of prior art systems and systems according to the invention; and FIG. 25 is a view showing mathematical formulas involved in the description of the operation of systems according to the invention.

BEST MODE FOR CARRYING OUT THE INVENTION

The invention will now be described in detail with reference to the drawings.

Figure 1:
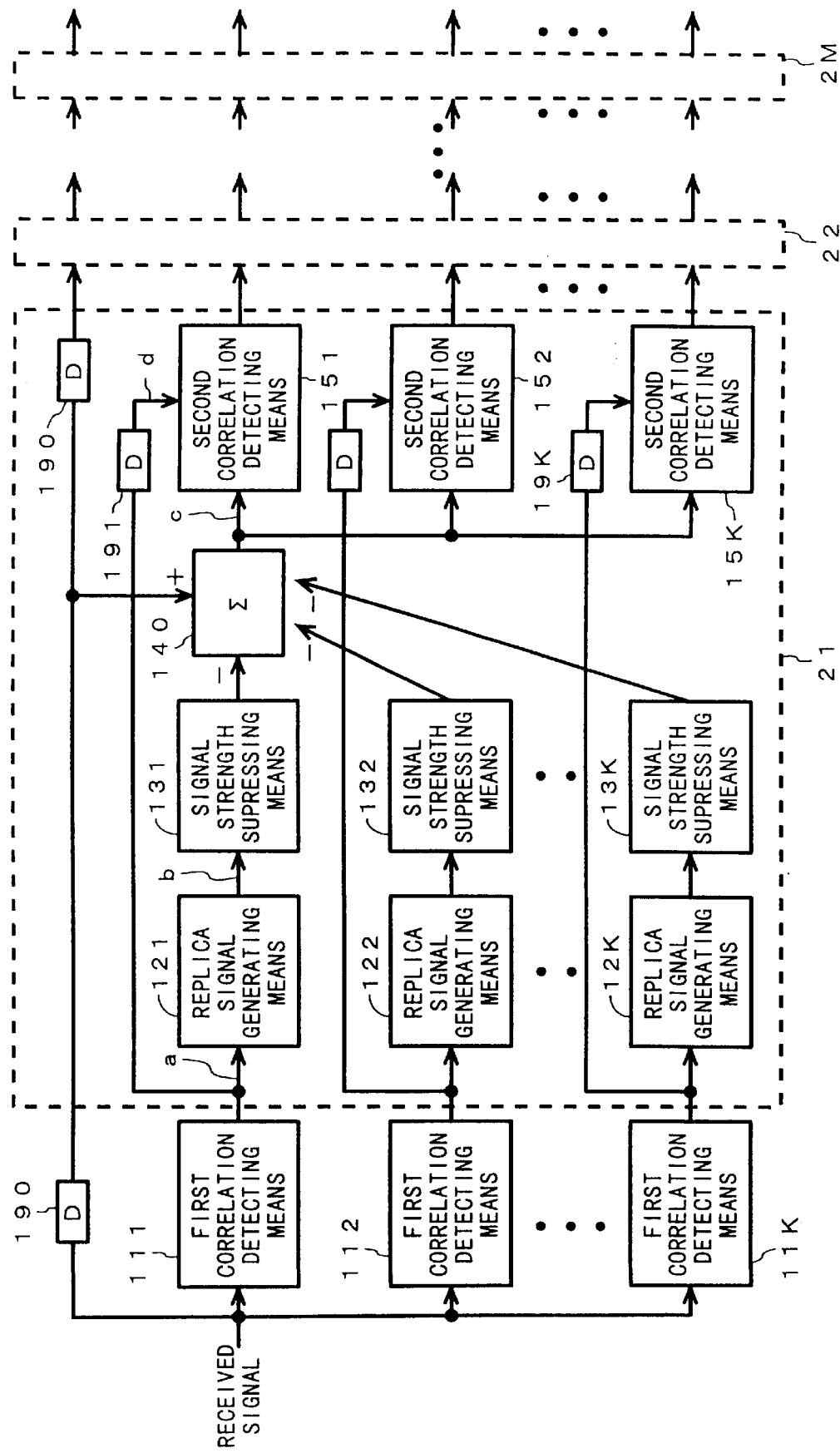
FIG. 1 is a block diagram showing the circuit construction of a first embodiment of the invention.

FIG. 1 is a block diagram showing the circuit construction of a first embodiment of the spread spectrum signal demodulator according to the invention. As shown in the figure, this embodiment of the spread spectrum signal demodulator comprises a plurality of first correlation detecting means 111 to 11K, which receives a received signal and detects correlations between spreading codes assigned to respective spread spectrum signals contained in the received signal and the received signal, a delay element 190 for delaying the received signal, and M (M being a positive integer including 1) interference cancellers 21 to 2M which are identical or alike in construction and connected one after another, the first interference canceller 21 receiving the output signals of the first correlation detecting means 111 to 11K and the delay element 190.

Since the interference cancellers 21 to 2M are identical or alike in construction as noted above, the circuit construction of the interference canceller 21 will be described typically. The interference canceller 21 includes replica signal generating means 121 to 12K which receive the output signals of the first correlation detecting means 111 to 11K, respectively, signal strength suppressing means 131 to 131K for suppressing the strength of replica signals as the output signals of the replica signal generating means 121 to 12K, respectively, a replica signal subtracting means 140 for subtracting the sum of the output signals of the signal strength suppressing means 131 to 13K from the delayed received signal by the delay element 190, delaying elements 191 to 19K for delaying respective input symbols, and second correlation detecting means 151 to 15K which receive the output signals of the subtracting means 140 and the delay elements 191 to 19K, respectively.

The replica signal generating means 121 to 12K generate replicas of the respective spread spectrum signals contained in the received signal by re-spreading the correlations detected by the first correlation detecting means 111 to 11K in timed relation to respective transmitted symbol timings with the spreading codes. The second correlation detecting means 151 to 15K detect correlations between a received signal after replica signal cancellation obtained from the replica signal subtracting means 140 and the spreading codes assigned to the respective spread spectrum signals contained in the received signal.

Circuit construction examples of the individual elements of the interference canceller 21 will now be described. First, an example of the replica signal generating means 121 will be described with reference to FIG. 2. Since the replica signal generating means 121 to 12K are identical or alike in construction, the replica signal generating means 121 will be described typically.

As shown in the figure, the replica signal generating means 121 includes a latch 321 which receives the output signal from the first correlation detecting means 111, a spreading code generator 323 for generating a spreading code and a multiplier 322 for multiplying the output of the latch 321 and the pertinent spreading code by each other. The latch 321 latches a signal inputted for each symbol, and holds and outputs data of the latched signal for one symbol period. A spreading code generator 323 generates a predetermined spreading code in timed relation to a symbol timing. The multiplier 322 outputs the product of the output of the latch 321 and the spreading code. The symbol timing is provided by the first correlation detecting means 111.

Figure 3:
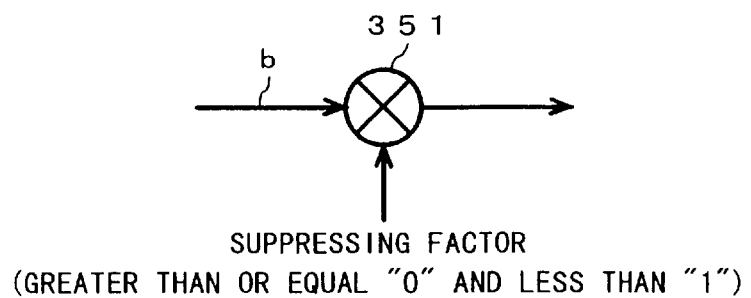
FIG. 3 is a block diagram showing an example of signal strength suppressing means shown in FIG. 1.

An example of the signal strength suppressing means 131 will now be described with reference to FIG. 3. Since the signal strength suppressing means 131 to 13K are identical or alike in construction, the signal strength suppressing means 131 will be described typically.

Referring to the figure, a multiplier 351 outputs the product of its input signal and a predetermined suppressing factor greater than or equal "0" and less than "1". The spread spectrum signal demodulator which is realized in the prior art is equivalent to the case where the factor is set to "1". In this case, the problem in the prior art as discussed before is generated. To solve this problem, it is very important to reduce the strength of replica signals or correlation signals. While in the above example the suppressing factor is fixed, this is by no means limitative.

Figure 4:
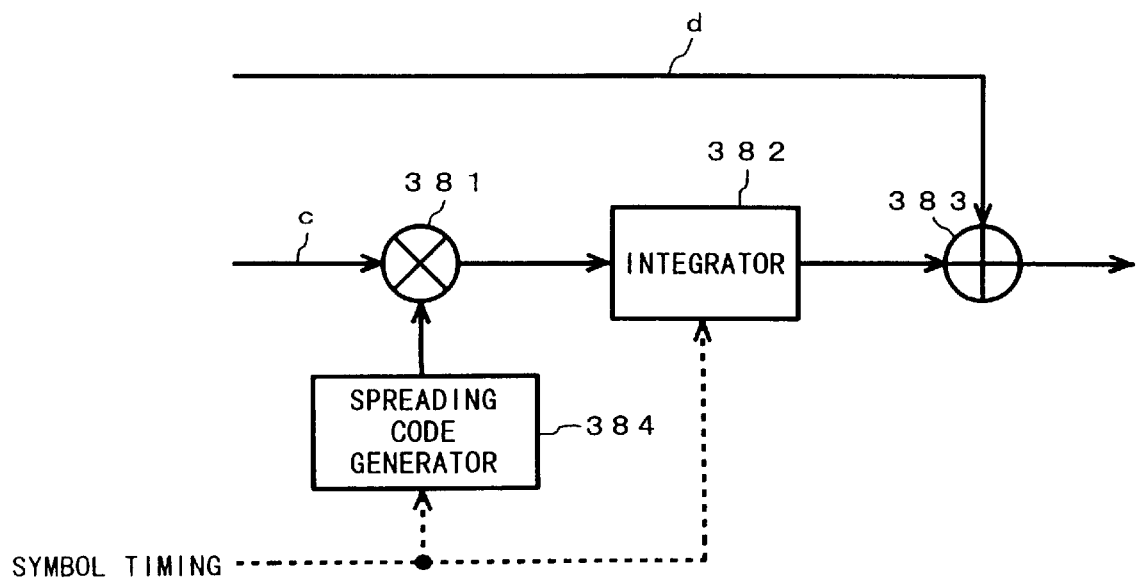
FIG. 4 is a block diagram showing an example of second correlation detecting means shown in FIG. 1.

An example of the second correlation detecting means 151 will now be described with reference to FIG. 4. Since the second correlation detecting means 151 to 15K are identical or alike in construction, the second correlation detecting means 151 will be described typically.

As shown in the figure, the second correlation detecting means 151 includes a multiplier 381 for multiplying the output signal of the replica signal subtracting means 140 and a spreading code generated by a spreading code generator 384, an integrator 382 for integrating the multiplification result or product for one symbol period, and an adder 383 for adding a signal, which is obtained as a result of delaying of the output signal of the first correlation detecting means 111 in the delaying element 191, to the integration result. The spreading code generator 384 generates a predetermined spreading code in timed relation to a symbol timing. The mutilplier 381 outputs the result of multiplification of the output signal from the replica signal cancellation means and the spreading code by each other. The integrator 382 outputs the result of integration of its input signal in timed relation to a symbol timing for one symbol period. The adder 383 outputs the sum of the input signal to the replica signal generating means 121 shown in FIG. 1 and the output of the integrator 382.

Figure 2:
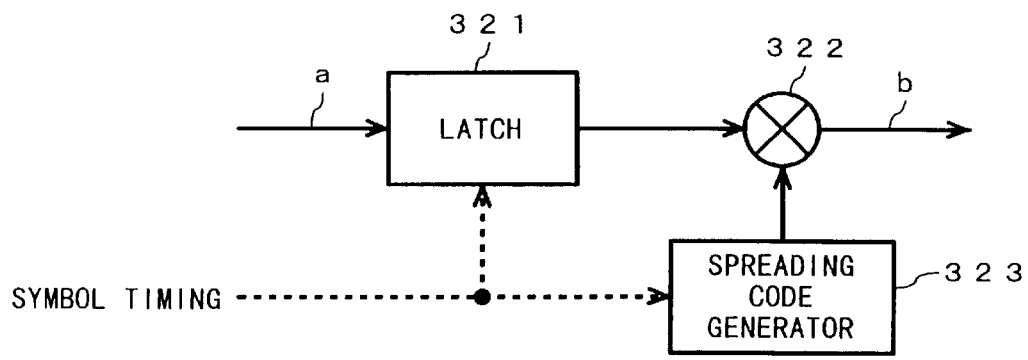
FIG. 2 is a block diagram showing an example of replica signal generating means shown in FIG. 1.

The operation of the embodiment shown in FIG. 1 will now be described by using mathematical formulas. A circuit construction as shown in FIG. 2 is adopted for the replica signal generating means 121 to 12K, a circuit construction as shown in FIG. 3 for the signal strength suppressing means 131 to 13K, and a circuit construction as shown in FIG. 3 for the second correlation detecting means 151 to 15K. In the following description, a baseband signal processing is assumed, and all the signals are to be expressed as complex signals. It is possible as well, however, to obtain an equivalent process in an IF band or the like.

The output signal of a first correlation detecting means 11k (k' 1, 2, ..., K) is given by the formula (3) noted above, and in the vector expression it is given by the formula (4) or (5) shown in FIG. 23. Assuming that the suppressing factors 1 to K have the same value s, the output of the replica signal subtracting means 140 is given by formula (16) shown in FIG. 24, i.e., the subtraction of the sum of the output signals of the signal strength suppressing means 131 to 13K from the output signal zr of the delaying element 190. In this embodiment, the suppressing factors 1 to K are all set to the same value s, but this is by no means limitative.

The output signal $\hat{d}_k^{(1)}$ of a second correlation detecting means 15k (k=1, 2, ..., K) is given by formula (17) in FIG. 24, and in vector expression it is given by formula (18) in FIG. 25.

With a plurality of interference cancellers connected to the following stages as shown in FIG. 1, the operations of the replica signal generating means, the signal strength suppressing means, the replica signal subtracting means and the second correlation detecting means are executed iteratedly. Denoting the output signal of an M-th interference canceller 2M by a vector $\hat{d}^{(M)}$, it is given by formula (19) in the same figure.

The correlation detected by a first correlation detecting means 11k (k=1, 2, ..., K) is given by the formula (4), which can be replaced with formula (20) in the same figure.

By substituting the formula (20) into the formula (19), we obtain formula (21) in the same figure.

In the formula (21), the right side first term is the product of the constant 1/s, the reception level A of the original signal, and the transmitted symbol d. This is the desired signal component to be detected. The second term is represents a value which raises the product of the matrix type operator $\tilde{C}$ given in the formula (4) and the constant 1/s to the Mth power (M is the number of interference canceller stages) involved, and represents the residual interference component. This indicates that the interference component is reduced with increasing number of interference cancellers provided the correlation matrix C meets a condition given by formula (22) in the same figure.

Assuming for the sake of brevity that the symbol timings of the signals are synchronized, the correlation matrix C is equivalent to the one shown in the formula (5). As described before, according to the invention asynchronous symbols can be handled in the same manner as with synchronous symbols, and this means that the invention is applicable to asynchronous symbol cases to obtain the same effects as obtained in the synchronous symbol case.

Generally, the correlation matrix C in the form given by the formula (5) can be diagonalized into formula (23) shown in the same figure by using orthogonal matrix X and eigenvalues $\alpha_i$ (i=1, 2, ..., K) of matrix C.

Thus, formula (24) in the same figure holds. Consequently, the formula (22) which expresses the condition that the interference component is reduced with increasing number of interference cancellers is equivalent to formula (25) in the same figure.

The eigenvalues $\alpha_i$ of the correlation matrix are determined by the spreading codes of the spread spectrum signals, code waveforms, signal arrival time differences, etc., and the interference component may be made to be as less as desired with the number of interference cancellers increased by setting the suppressing factor s such as to meet the formula (25) with respect to these eigenvalues of correlation matrix.

As an example, as the eigenvalues when the spreading factor is 32 and the number K of signals to be detected is 16, the mean of eigenvalues is 1, and the variance is 0.47. These values pertain to the case, in which the transmission signal waveform is not bandwidth limited, all the signals to be detected are symbol synchronized, and the spreading codes are random codes. In this case, with the suppressing factor s set to about 0.6, in the AWGN channel the signal strength can be reduced by about 8 dB in the case with an interference canceller number M of 3 and by about 12 dB in the case with M of 6.

While the above embodiment has been described in connection with the circuit constructions shown in FIGS. 2 to 4 which are adopted for the replica signal generating means 121 to 12K, the signal strength suppressing means 131 to 13K and the second correlation detecting means 151 to 15K, the circuit constructions are by no means limitative. Other examples of the replica signal generating means 121 to 12K, the signal strength suppressing means 131 to 13K and the second correlation detecting means 151 to 15K will now be described.

Figure 5:
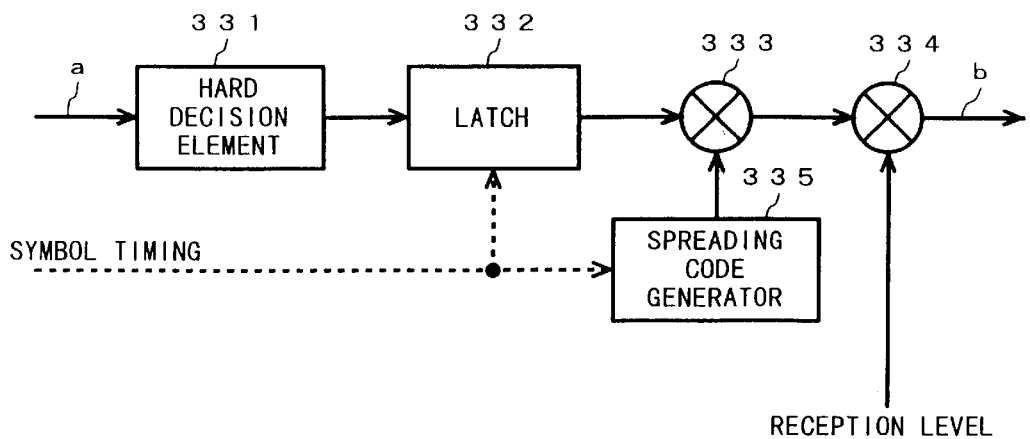
FIG. 5 is a block diagram showing a different example of replica signal generating means.

FIG. 5 shows a second example of the replica signal generating means 121. As shown, the replica signal generating means 121 includes a hard decision element 331, a latch 332, multipliers 333 and 334, and a spreading code generator 335. The hard decision element 331 determines the sign of the input signal and outputs the determined sign data. The latch 332 latches the sign data of the hard decision element 331 in timed relation to symbol timing, and holds and outputs the latched value for one symbol period. The spreading code generator 335 generates predetermined spreading codes in timed relation to symbol timings. The multiplier 333 outputs a signal obtained as a result of multipification of the output of the latch 322 and a spreading code by each other. The multiplier 334 outputs a signal obtained as a result of multiplification of the reception level of a spread spectrum signal corresponding to the input signal to the hard decision element 331 and the output of the multiplier 333 by each other.

Figure 6:
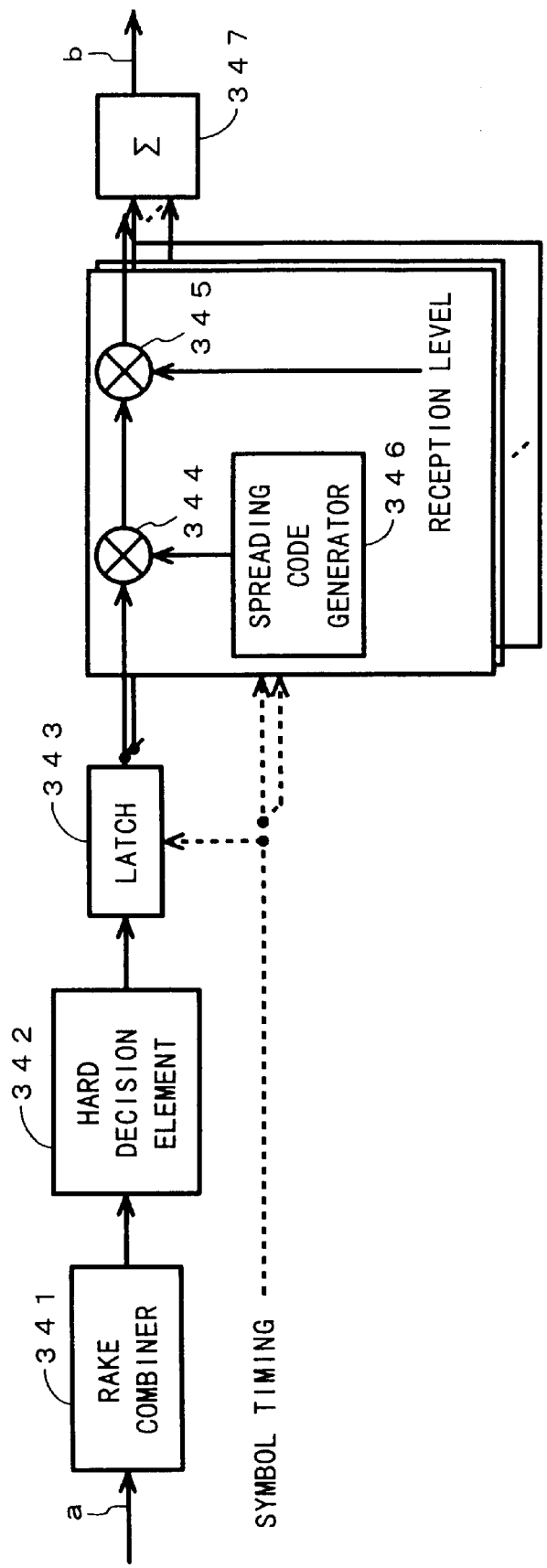
FIG. 6 is a further example of replica signal generating means.

A third example of the replica signal generating means 121 will now be described with reference to FIG. 6. As shown, the replica signal generating means 121 includes an RAKE combiner 341, a hard decision element 342, a latch 343, multipliers 344 and 345, a spreading code generator 346, and an adder 347.

The RAKE combiner 341 corrects time differences of a plurality of time dispersed arrival signals which are identically observed in the input signal, and outputs the combined these signals. The hard decision element 342 determines the sign of the input signal and outputs the determined sign data. The latch 343 latches the sign data of the hard decision element 342 in timed relation to symbol timing, and holds and outputs the latched data for one symbol period.

The spreading code generator 346 generates a predetermined spreading code in timed relation to a symbol timing corresponding to one of a plurality of arrival signals which are combined in the RAKE combiner 341. The mutliplier 344 outputs a signal obtained as a result of multiplication of the output of the latch 343 and the spreading code by each other. The multiplier 345 outputs a signal obtained as a result of multiplification of the reception level of a spread spectrum signal corresponding to one of a plurality of arrival signals that are combined in the RAKE combiner 341 and the output of the mutliplier 344 by each other. Generally, pluralities of multipliers 344 and 345 and spreading code generators 346 are provided, which correspond in number to the number of arrival signals combined in the RAKE combiner 341, and spreading code generation and signal level setting are made on the basis of the symbol timings and reception levels corresponding to the respective arrival signals that are combined. The adder 347 adds together the plurality of signals outputted form the multipliers 345 in the above way, and outputs a sum signal.

A second example of the signal strength suppressing means 131 will now be described with reference to FIG. 7. As shown, the signal strength suppressing means 131 includes a limiter 361 and a multiplier 362. The limiter 361 compares the strength of the input signal with a predetermined threshold level. When the strength of the input signal is below the threshold, the limiter 361 outputs the input signal as such, and when the strength is above the threshold, it saturates the output signal strength. The multiplier 362 outputs a signal obtained as a result of multiplification of the output signal of the limiter 361 and a predetermined suppressing factor by each other.

Figure 7:
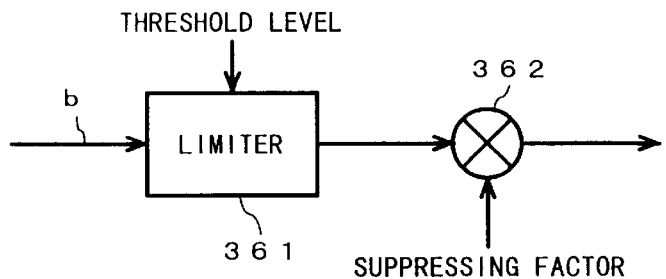
FIG. 7 is a block diagram showing a different example of the signal strength suppressing means.
Figure 8:
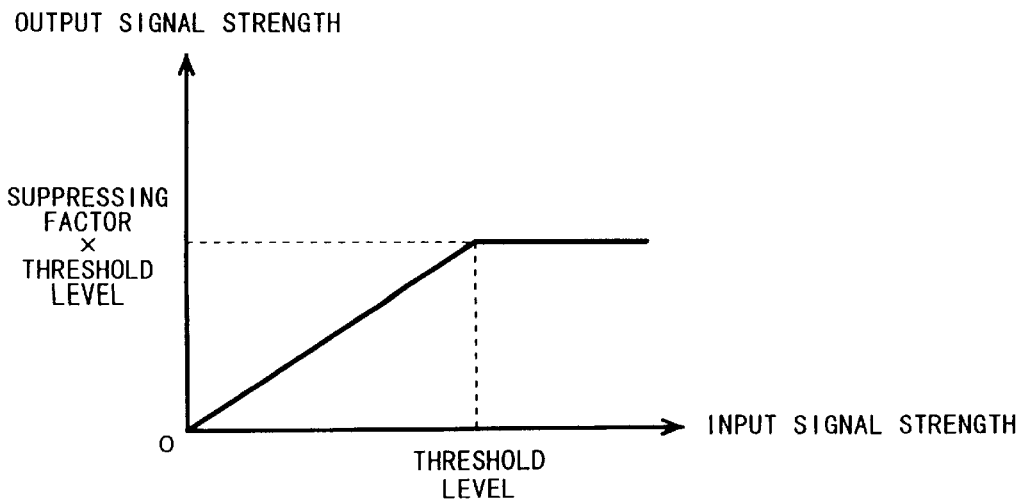
FIG. 8 is a graph showing a characteristic of the signal strength suppressing means shown in FIG. 7.

FIG. 8 is a graph showing the strength relation between the input and output signals which input to and output from the signal strength suppressing means shown in FIG. 7. From the graph, it will be seen that when the strength of the input signal is below a threshold level, the signal strength suppressing means outputs the input signal strength multiplied by the suppressing factor, while when the strength is above the threshold, it outputs the threshold level multiplied by the suppressing factor.

Various further examples of the signal strength suppressing means 131 are conceivable. Generally, the signal strength suppressing means 131 to 13K have a role of suppressing the signal strength by making the mean power of the output signal to be less compared to the mean power of the input signal.

Figure 9:
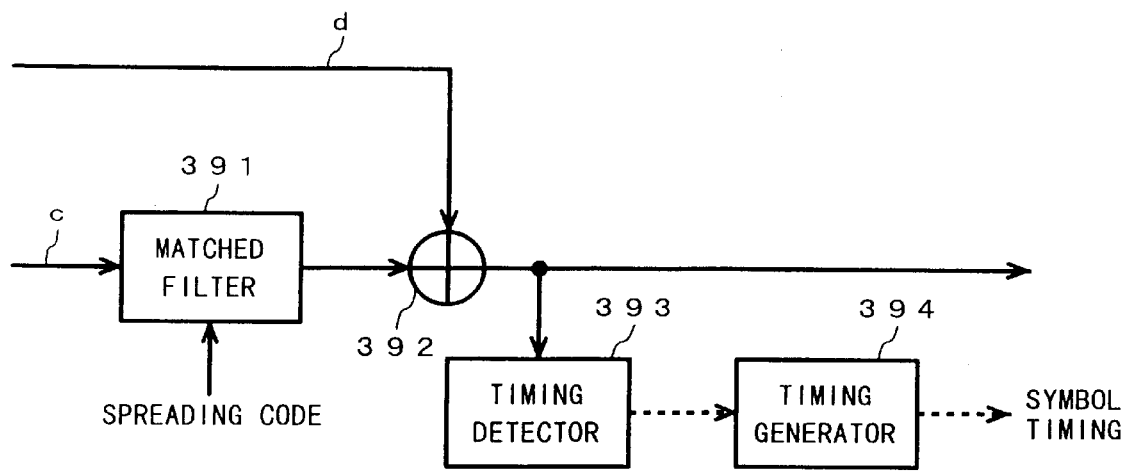
FIG. 9 is a block diagram showing a different example of the second correlation detecting means.

A second example of the second correlation detecting means 151 will now be described with reference to FIG. 9. This example of the second correlation detecting means 151, like the first example shown in FIG. 4, receives the two input signals. This example, however, is different from the first example in that it generates symbol timings. As shown, the second correlation detecting means 151 includes a matched filter 391, an adder 392, a timing detector 393, and a timing generator 394.

The matched filter 391 detects a correlation between the input signal and a predetermined spreading code, and outputs a correlation signal. The adder 392 adds together the input signal to the replica signal generating means shown in FIG. 1 and the output signal of the matched filter 391, and outputs the sum. The timing generator 393 detects a symbol timing forefront from a peak of the outputted correlation signal. The timing generator 394 generates symbol timing according to the output signal of the timing detector 393.

While the above description has concerned with examples of realizing hardware processes, this is by no means limitative, and it is possible to realize equivalent software processes by using circuits comprising universal processors, memories, etc.

FIG. 10 is a block diagram showing a second embodiment of the invention. As shown, this spread spectrum signal demodulator comprises a plurality of first correlation detecting means 111 to 11K which receive a received signal, a delay element 190 for delaying the received signal, and M (M being a positive integer) interference cancellers 31 to 3M which are identical or alike in construction and connected one after another, the first interference canceller 31 receiving the output signal of the delay element 190.

The interference cancellers 31 to 3M are identical or alike in construction, and the circuit construction of the interference canceller 31 will be described typically. The interference canceller 31 includes replica signal detecting means 121 to 12K which receive the output signals of the first correlation detecting means 111 to 11K, respectively, signal strength suppressing means 131 to 13K for suppressing the strength of the output signals of the replica signal generating means 121 to 12K, respectively, replica signal subtracting means 141 to 14K which receive the output signals of all the signal strength suppressing means but the pertaining one, respectively, second correlation detecting means 151 to 15K which receive the output signals from the replica signal subtracting means 141 to 14K, respectively, and a delay element 190 for delaying the received signal.

This embodiment does not use the delay elements 191 to 19K in the first embodiment shown in FIG. 1. On the demerit side, however, the embodiment requires K replica signal subtracting means. The second correlation detecting means 151 to 15K may be identical or alike in construction with the first correlation detecting means 111 to 11K.

In the first embodiment the replica signal subtracting means 140 generates residual signal by subtracting all the replica signals including the pertaining one from the received signal, whereas in the second embodiment the replica signal subtracting means 141 to 14K generate replica signal cancelled signals by subtracting all the replica signals but the pertaining one from the received signal. This means that the signal components to be detected in the second correlation detecting means are already contained in the replica signal cancelled signals.

For the other means, the circuit constructions and operations of the examples described before in connection with the first embodiment also apply to the second embodiment. The operation of the entire second embodiment will be readily understood with reference to the first embodiment, and is not described.

Figure 11:
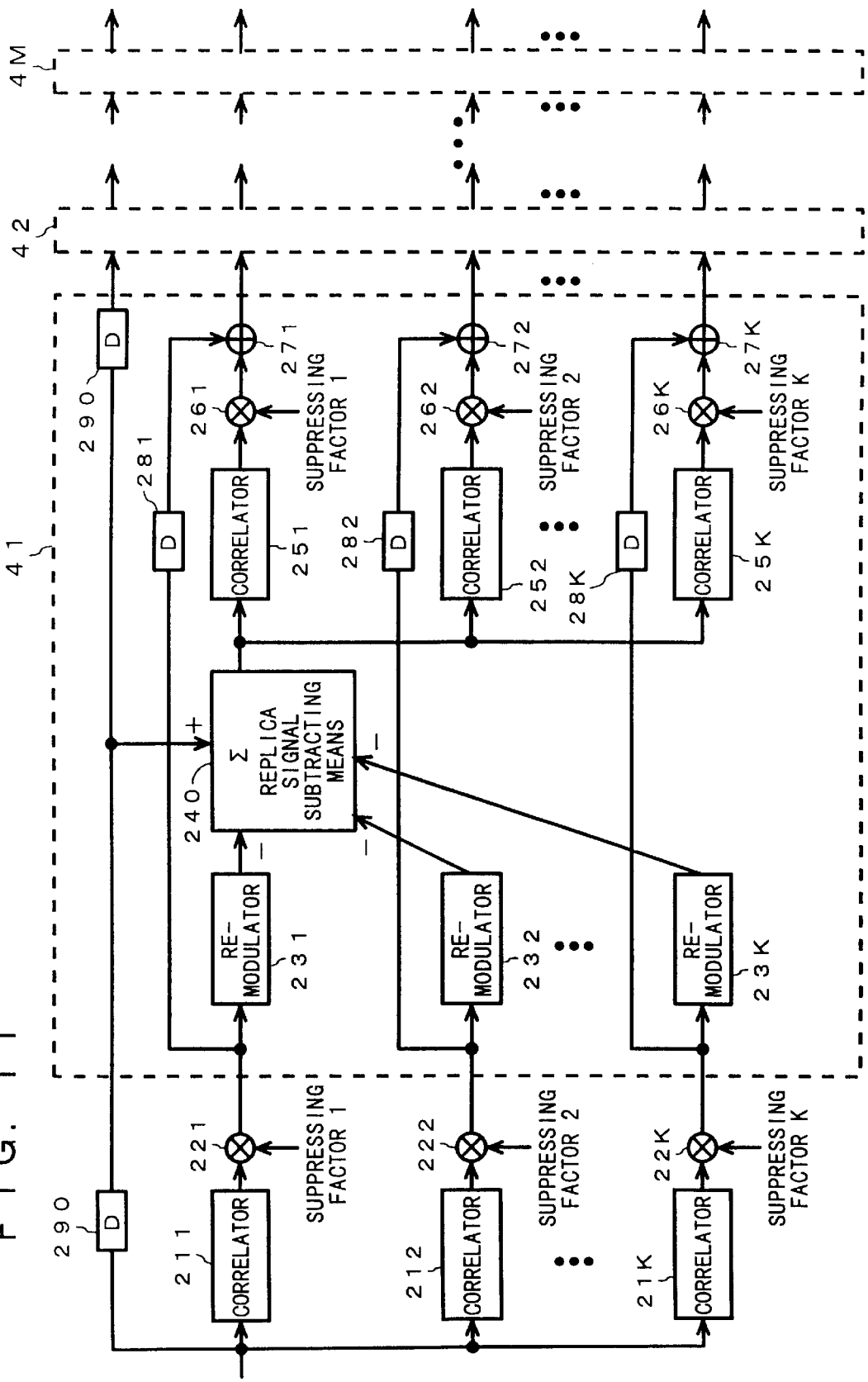
FIG. 11 is a block diagram showing the circuit construction of a third embodiment of the invention.

FIG. 11 is a block diagram showing a third embodiment of the spread spectrum signal demodulator according to the invention. As shown, this spread spectrum signal demodulator comprises correlators 211 to 21K which receive a received signal, multipliers 221 to 22K for suppressing signal strength, a delay element 290 for delaying the received signal, and M interference cancellers 41 to 4M connected one after another.

The interference cancellers 41 to 4M are idential or alike in construction, and the circuit construction of the interference canceller 41 will be described typically. The interference canceller 41 includes re-modulators 231 to 23K for generating replica signals, a replica signal subtracting means 240 for subtracting replica signals from a received signal, correlators 251 to 25K which are identical in construction with the correlators 211 to 21K, multipliers 261 to 26K for suppressing signal strength, adders 271 to 27K, delay elements 281 to 28K for delaying input signals, and a delay element 290 for delaying the received signal.

Figure 12:
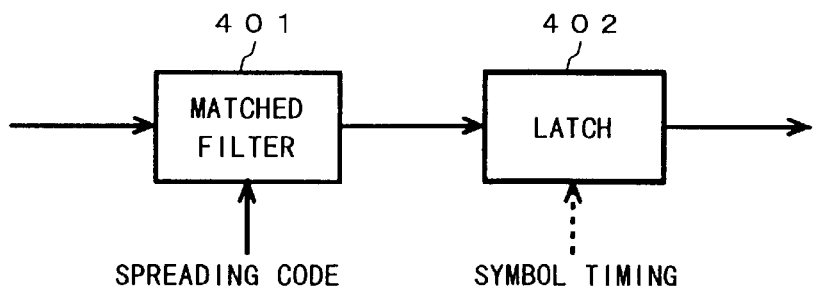
FIG. 12 is a block diagram showing an example of correlator shown in FIG. 11.
Figure 13:
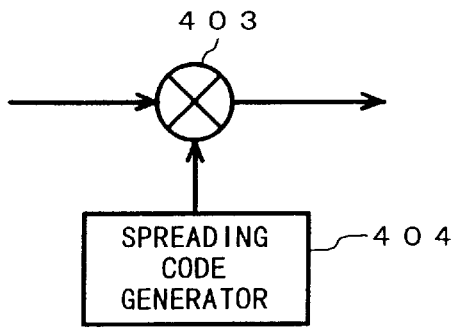
FIG. 13 is a block diagram showing an example of re-modulator shown in FIG. 11.

This embodiment, like the previous first embodiment, permit further interference signal reduction with the provision of a plurality of interference cancellers 41 to 4M connected one after another. The correlators 211 to 21K may have a circuit construction as shown in FIG. 12, including a matched filter 401 and latch 402, and the re-modulators 231 to 23K may have a circuit construction as shown in FIG. 13, including a multiplier 403 and a spreading code generator 404.

Assuming that M interference cancellers having the above circuit construction are connected as shown, the vector of the last detected signal is given by formula (26) in FIG. 25. On the other hand, the detected signal in the first embodiment is given by the formula (21). From the comparison of this formula (21) and the formula (26), it will be seen that the signal versus interference ratio and the signal versus noise ratio of the detected signal obtained in the first embodiment are the same as those obtainable in this embodiment.

It will be seen that with this embodiment the same signal quality of the detected signals as obtainable in the first embodiment can be obtained, although the place where the signal strength suppression is made is different. According to the invention, the signal strength suppression may be made before or after the re-modulators, before or after the replica signal subtraction, or before or after the correlators.

Figure 14:
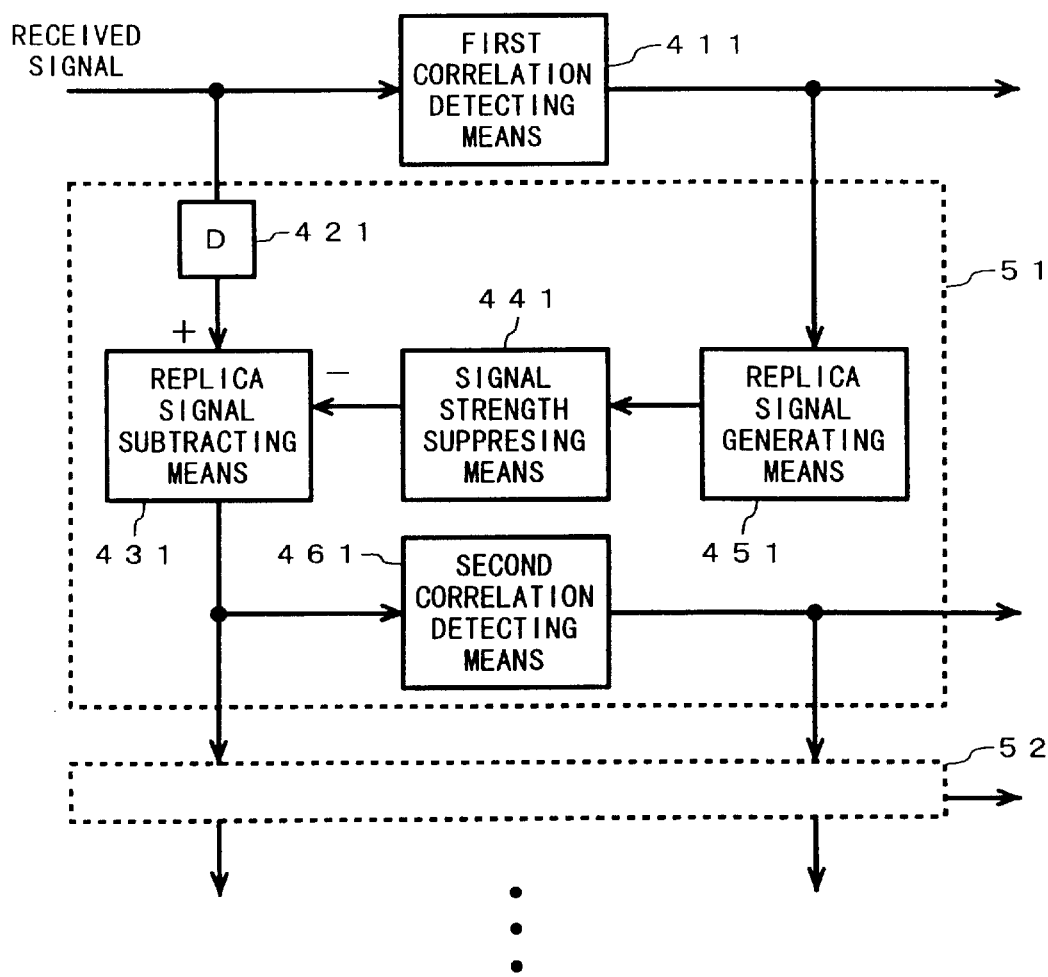
FIG. 14 is a block diagram showing the circuit construction of a fourth embodiment of the invention.

FIG. 14 is a block diagram showing a fourth embodiment of the invention. This embodiment comprises a first correlation detecting means 411 and a plurality of interference cancellers 51 to 5M which are identical or alike in construction and connected one after another. The interference canceller 51 as shown typically, includes a delay element 421 for delaying a received signal by one symbol period and outputting the signal in units of samples, a replica signal subtracting means 431, a signal strength suppressing means 441, a replica signal generating means 451, and a second correlation detecting means 461. The operations of the individual means are the same as those in the first embodiment, and are not described.

Figure 15:
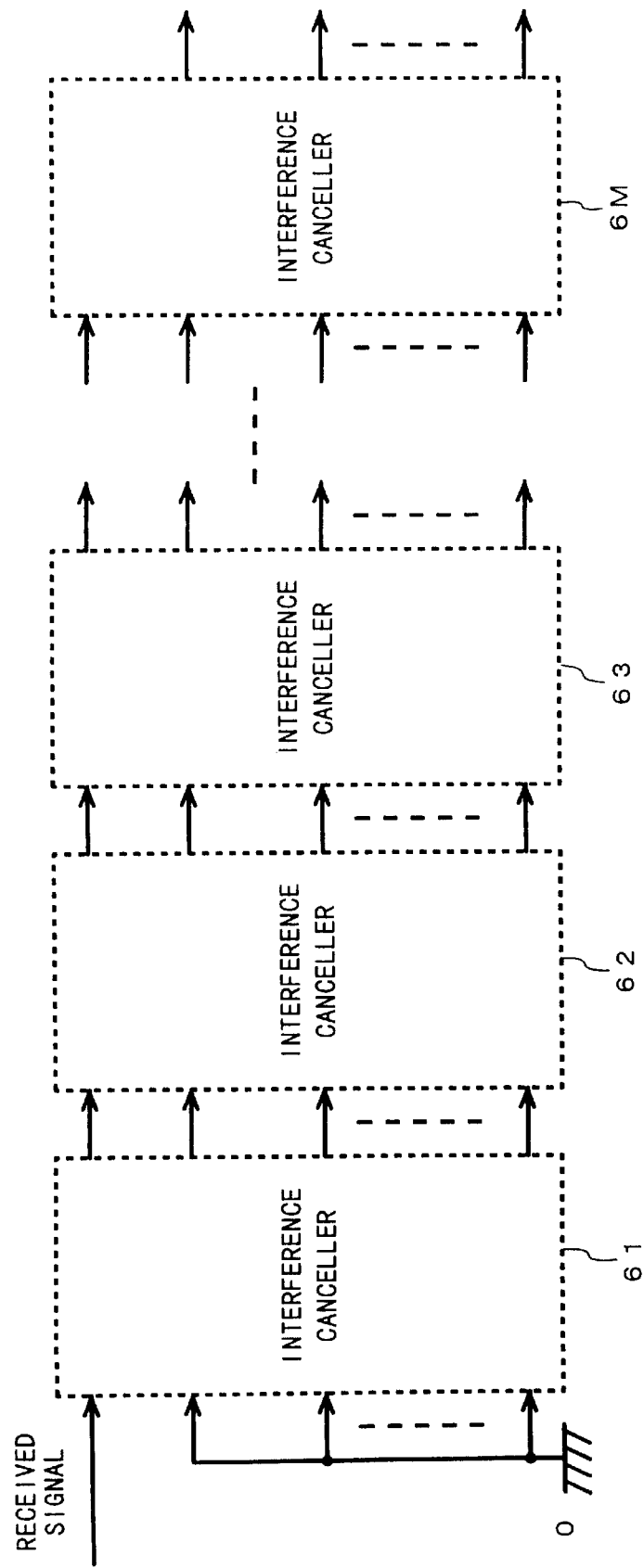
FIG. 15 is a block diagram showing the circuit construction of a fifth embodiment of the invention.

FIG. 15 is a block diagram showing a fifth embodiment of the invention. The embodiment comprises a plurality of interference cancellers 61 to 6M which are identical or alike in construction. The interference cancellers 61 to 6M are also identical or alike in construction with the interference canceller 21, 31 or 41 in the first, second or third embodiment.

When it is assumed that the interference canceller 61 in the circuit construction shown in FIG. 15 is identical in construction with the interference canceller 21 shown in FIG. 1, this case is equivalent to that zero signal is inputted to the replica signal generating means 121 to 12K in the interference canceller 21. With zero signal inputted to the replica signal generating means 121 to 12K shown in FIG. 1, the replica signal subtracting means 140 receives the received signal and the zero signal, and thus outputs the received signal to the second correlation detecting means 151 to 15K. This means that the outputs of the second correlation detecting means 151 to 15K are inputted to the second interference canceller 62 in this embodiment.

In other words, the interference canceller 61 shown in FIG. 15 which receives zero signal, has the roles of the first correlation detecting means 111 and 11K and the delay element 190 shown in FIG. 1, and the interference canceller 62, 63 . . . have the same roles of the interference canceller as 21, 22, . . . shown in FIG. 1, respectively. Thus, in this embodiment, unlike the previous first to fourth embodiments, a different circuit from the first interference canceller 21, 31, 41 or 51 need not be connected as a stage preceding this interference canceller, but it is possible to use the first correlation detecting means 61 which is identical in construction with the other interference cancellers 62 to 6M from the outset. It is thus possible to simplify the circuit construction and reduce the circuit production cost.

Figure 16:
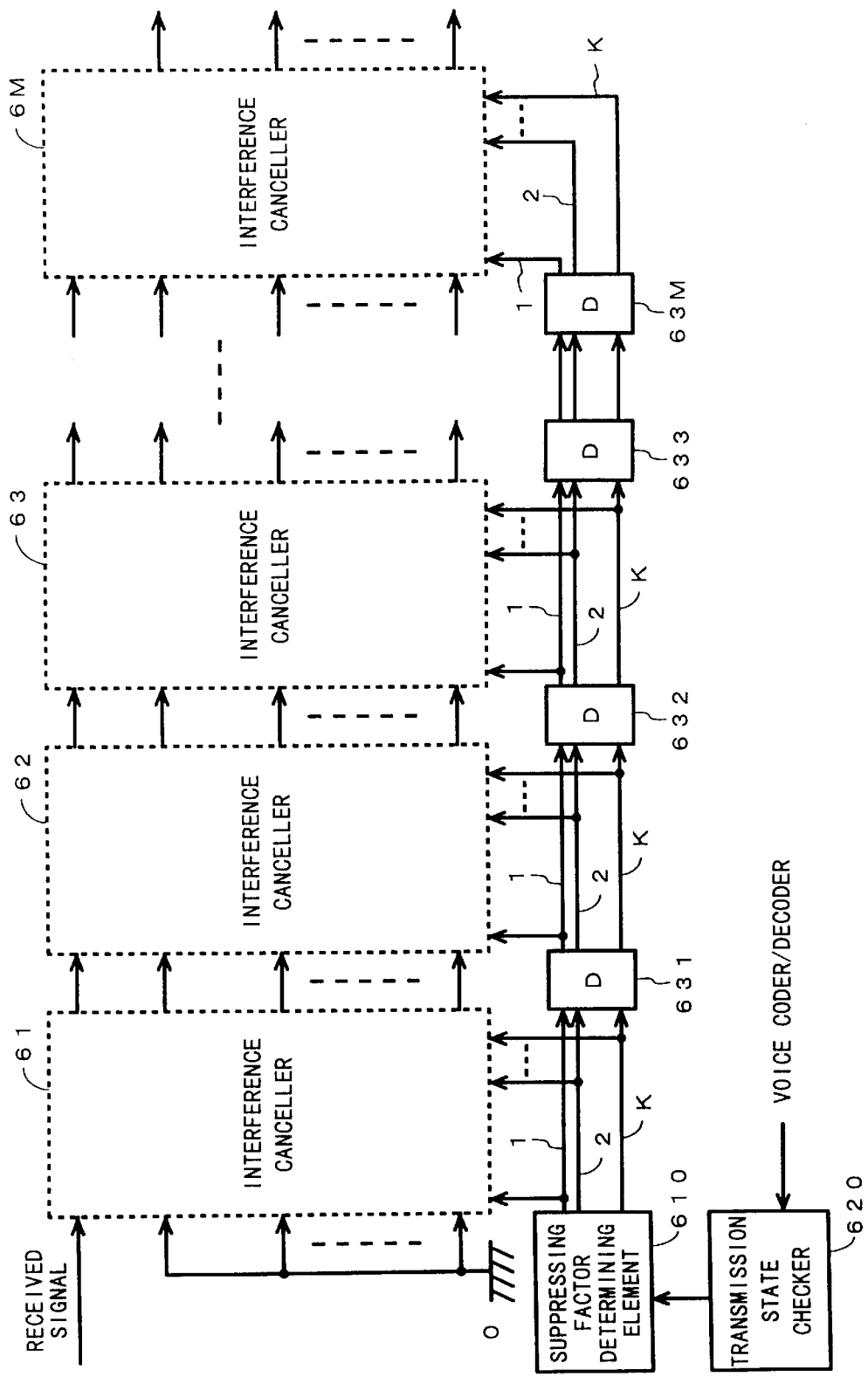
FIG. 16 is a block diagram showing the circuit construction of a sixth embodiment of the invention.

FIG. 16 is a block diagram showing a sixth embodiment of the invention. Again this embodiment comprises a plurality of interference cancellers 61 to 6M which are identical or alike in construction with that described before in connection with the fifth embodiment. This embodiment features the provision of means for tentatively making suppressing factor with respect to a signal to be demodulated, among the spread spectrum signals contained in a received signal, to be zero when the transmission of the signal is tentatively suspended due to a non-voice or non-continuous transmission mode.

A transmission state checker 620 is an example of such means, and it checks the transmission state of a signal as the subject of detection, i.e., checks whether the transmission of the subject signal is tentatively interrupted, from a signal from a voice coder/decoder (not shown). A suppressing factor determining element 610 makes the suppressing factor of the tentatively interrupted signal to be zero. When the subject signal to be detected is being transmitted, the suppressing factor determining element 610 outputs a predetermined value or a value corresponding to the subject signal being transmitted as the suppressing factor. In this way, the suppressing factor determining element 610 outputs suppressing factors 1, 2, . . . ,K, which are first inputted to the interference canceller 61, and then after being delayed by a process delay time, which is required for the interference canceller 61, in a delay element 631, are inputted to the next interference canceller 62. The suppressing factors are thus inputted up to the last interference canceller 6M.

Figure 17:
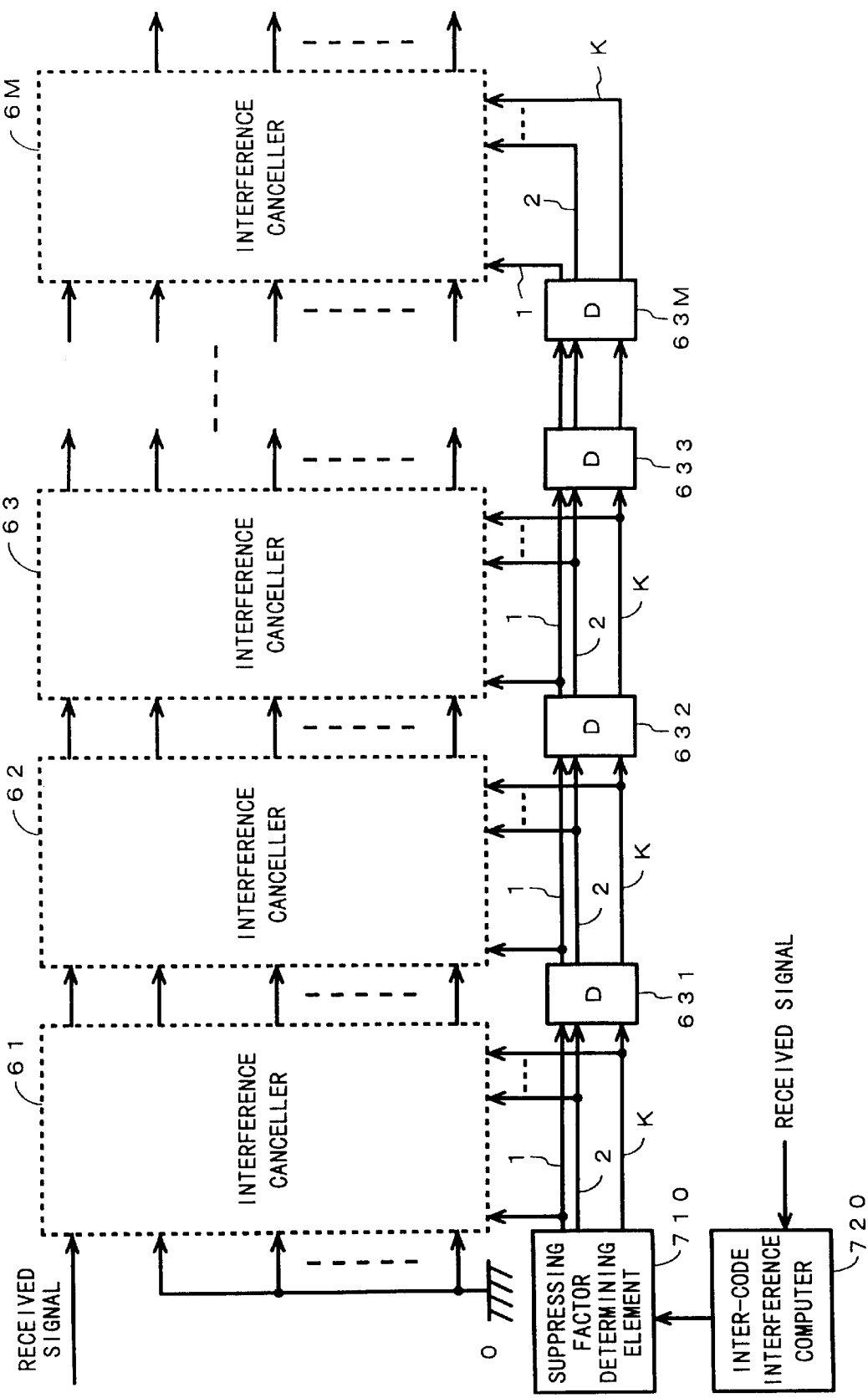
FIG. 17 is a block diagram showing the circuit construction of a seventh embodiment of the invention.

FIG. 17 is a block diagram showing a seventh embodiment of the invention. This embodiment again comprises interference cancellers 61 to 6M which are identical or alike in construction with that described before in connection with the fifth embodiment.

An inter-code interference computer 720 determines the amount of correlation between the spreading code of each subject signal to be detected and the spreading codes of the other subject signals on the basis of a received signal. A suppressing factor determining element 710 sets optimum suppressing factors 1, 2, . . . , K according to the determined correlation amounts, and supplies these factors through delay elements 731, 732 . . . , 73M to the interference cancellers 61 to 6M. Specifically, the detection characteristic is further improved by momentarily setting a suppressing factor with respect to a great correlation subject signal to be detected to be small.

Figure 18:
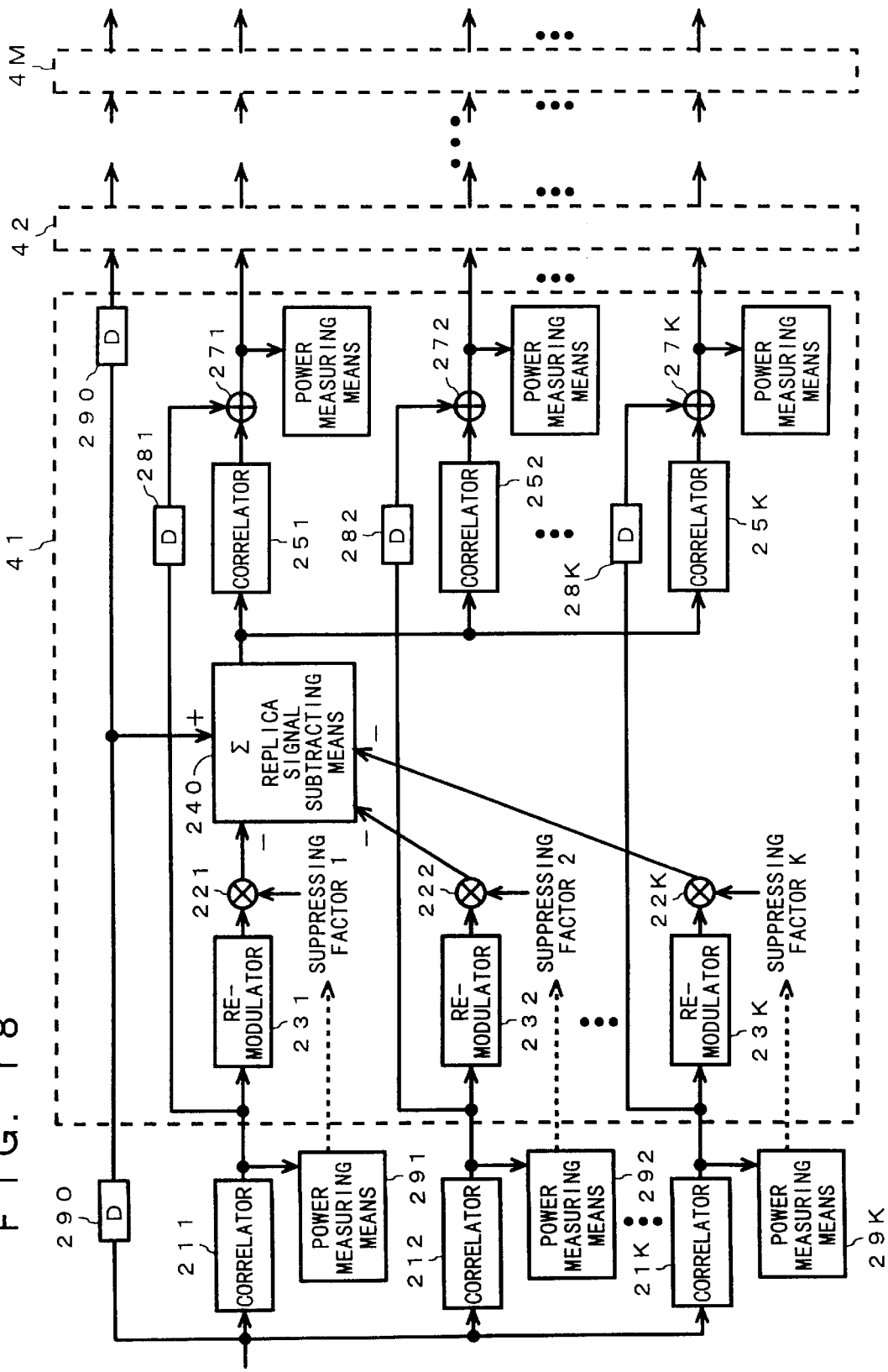
FIG. 18 is a block diagram showing the circuit construction of an eighth embodiment of the invention.
Figure 19:
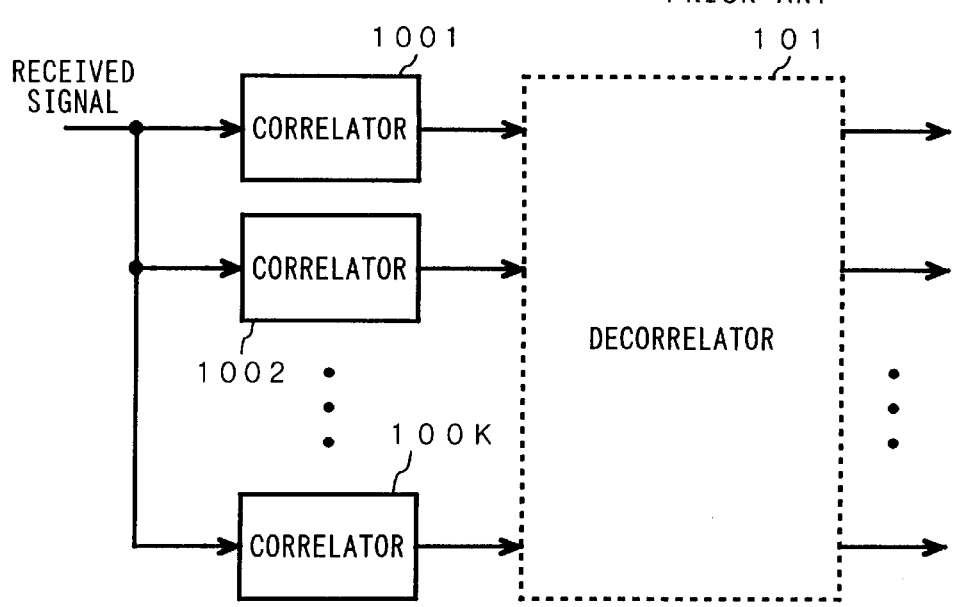
FIG. 19 is a block diagram showing the circuit construction of a spread spectrum signal demodulator of a decorrelation system in the prior art.
Figure 20:
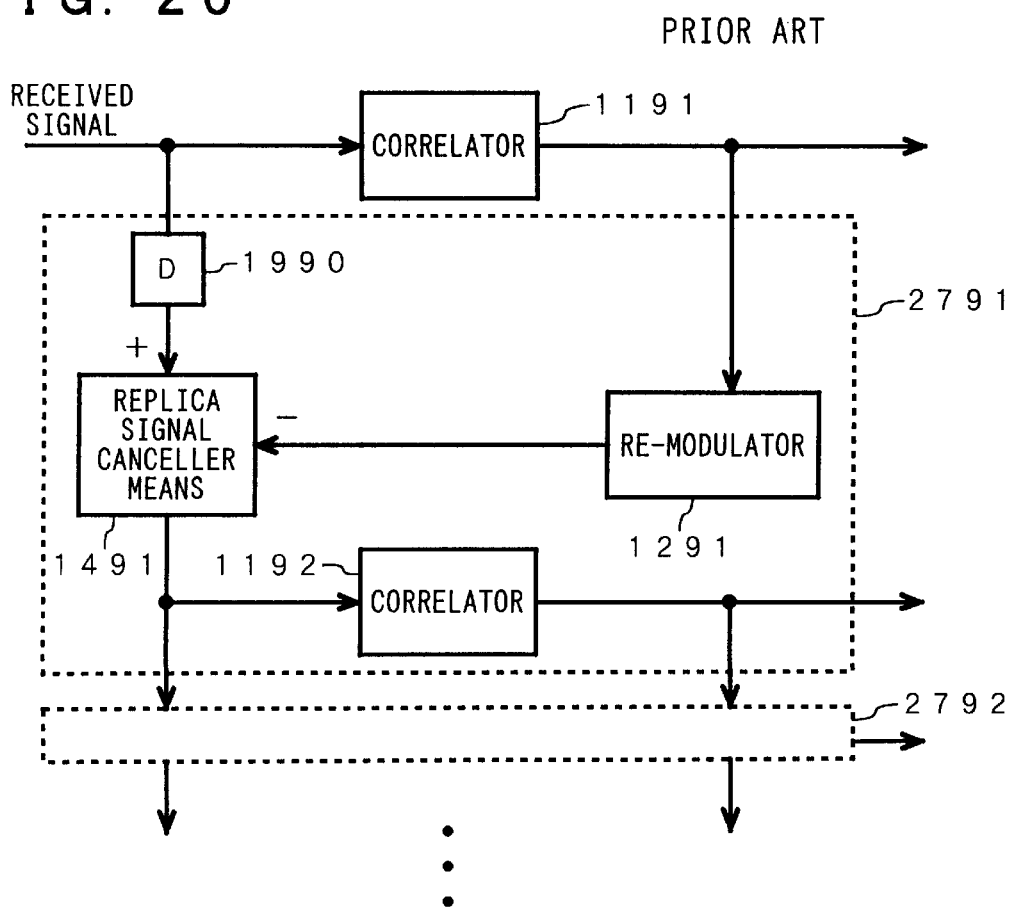
FIG. 20 is a block diagram showing a first circuit construction of a spread spectrum signal demodulator of a replica signal cancellation system in the prior art.
Figure 21:
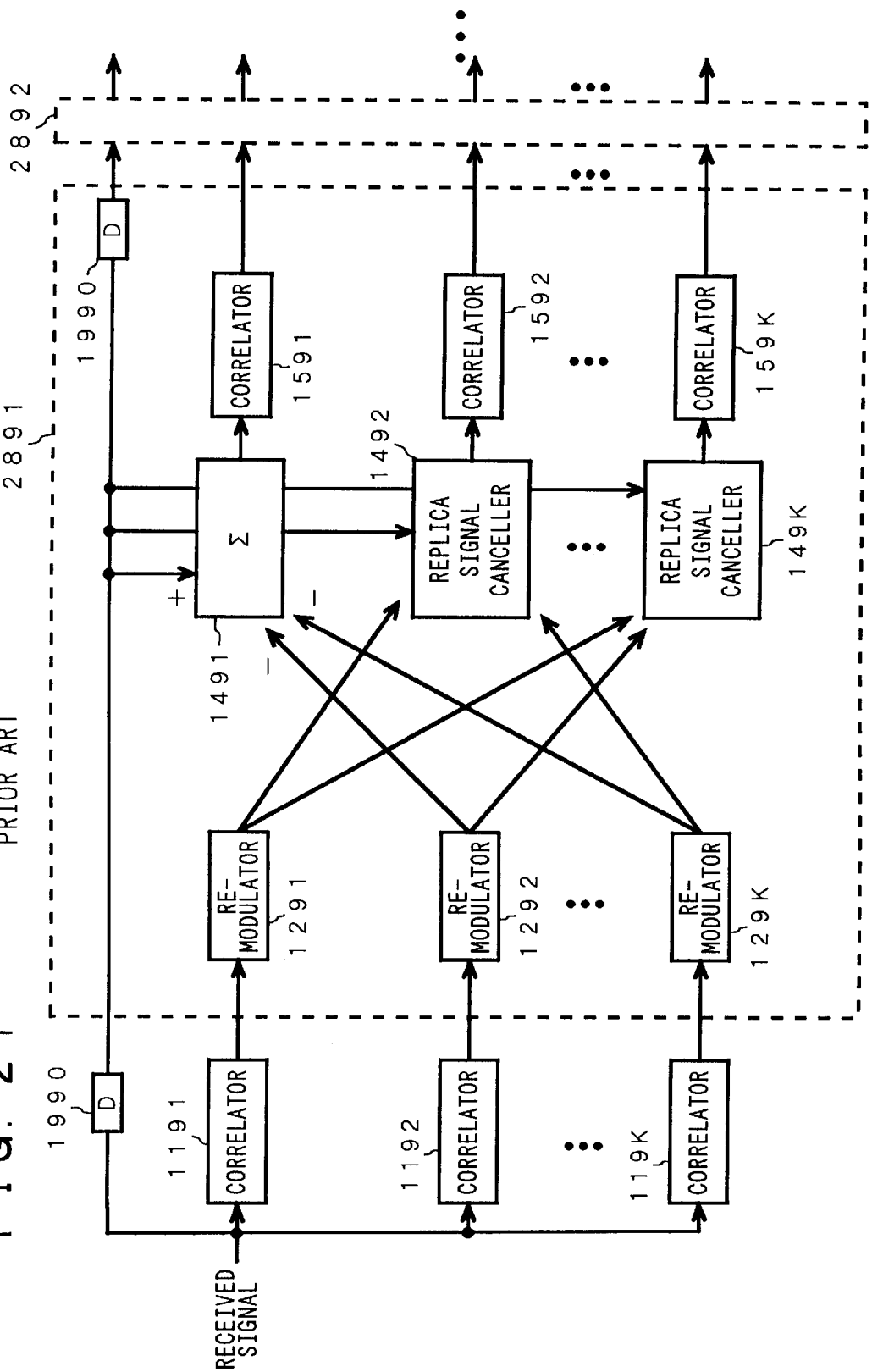
FIG. 21 is a block diagram showing a second circuit construction of the spread spectrum signal demodulator of the replica signal cancellation system in the prior art.

FIG. 18 is a block diagram showing an eighth embodiment of the invention. As shown, the embodiment includes power measuring means 291 to 29K for measuring the received power levels of respective spread spectrum signals contained in a received signal. The other reference numerals and symbols like those in FIG. 11 designate like or equivalent parts. In this embodiment, the suppressing factors that are supplied to multipliers 221 to 22K are determined according to the results of measurements in the power measuring means 291 to 29K.

In the embodiments described above, for instance the embodiment shown in FIG. 1, the first correlation detecting means 111 to 11K correspond in number to the number of the second correlation detecting means 151 to 15K in the interference canceller 21. However, the second correlation detecting means 151 to 15K may be provided in a greater number than the number of the first correlation detecting means 111 to 11K. In this case, the output signals of the delay elements 191 to 19K are not inputted to the additional second correlation detecting means.

Furthermore, it is obvious that the transmission state checker 620, the suppressing factor determining element 610, the suppressing factor delaying elements 631 to 63M, the inter-code interference computer 720, the suppressing factor determining element 710, and the suppressing factor delaying elements 731 to 73M described before in connection with the sixth and seventh embodiments (shown in FIGS. 16 and 17), are applicable to the first to fourth embodiments.

Still further, in the first to eighth embodiments, each interference canceller may contain a bandwidth limiting filter, which executes the same process as bandwidth limiting executed on the transmitting side. For example, it is possible to provide a bandwidth limiting filter after the replica signal subtracting means shown in FIG. 1, 10 or 11. The bandwidth limiting filter can improve the interference cancellation performance for it can make a replica interference signal to be close to an interference signal on a transmission link.

INDUSTRIAL APPLICABILITY

The prior art replica signal cancellation system including Japanese Laid-Open Patent Publication No. 7-131382 (U.S. Pat. No. 5,467,368), had a drawback that its detection performance is deteriorated with increasing number of interference cancellers. Particularly, where M interference cancellers are connected in a parallel system for generating replica signals on a soft determination basis, the detection performance is given by the formula (14), and diverging of power of the correlation matrix in the right side second term of the formula is a cause of the performance deterioration. In the spread spectrum signal demodulator based on the interference cancellation according to the invention, the parallel system for generating replica signals on the soft determination basis is such that the formula (21) or (26) expresses its detection performance and that the formula (25) expresses a condition to be met for the converging of the right side second term of these formulas. In other words, the interference cancellation performance is improved by setting suppressing factors s which satisfy the formula (25) according to the distribution of the eigenvalues $\alpha i$ of the correlation matrix, and this effect is particularly pronounced in a case where a plurality of interference cancellers are connected.

Likewise, in a system in which replica signals are generated on the hard decision basis, according to the invention the detection performance can be improved by suppressing the replica signals or equivalent means.

Moreover, where the spread spectrum signal demodulator based on the interference cancellation according to the invention uses matched filters for executing the correlation detection a plurality of times, the second correlation detecting means in the individual interference cancellers execute symbol timing detection, that is, the symbol timing extraction is made while making interference component cancellation. The accuracy of the symbol timing extraction thus can be improved with increasing number of interference cancellers. This concept is not incorporated in any prior art system.

We claim:

1. A spread spectrum signal demodulator receiving a received signal including a plurality of spread spectrum signals, comprising:

at least one first correlation detecting means for detecting correlations between spreading codes assigned to the respective spread spectrum signals contained in the received signal and the received signal; and at least one interference canceller including:

at least one replica signal generating means for generating replicas of the respective spread spectrum signals contained in the received signal by causing respreading of the correlations detected by the first correlation detecting means in timed relation to respective symbol timings with the spreading codes;

at least one replica signal subtracting means for subtracting replica signals generated in the replica signal generating means from the received signal;

at least one second correlation detecting means for detecting correlations between a received signal after replica signal cancellation obtained from the replica signal subtracting means and the spreading codes assigned to the respective spread spectrum signals contained in the received signal; and at least one signal strength suppressing means for multiplying a suppressing factor greater than or equal "0" and less than "1" connected at least one of between the first correlation signal detecting means and the replica signal generating means, between the replica signal generating means and the replica signal subtracting means, and between the replica signal subtracting means and the second correlation detecting means.

2. The spread spectrum signal demodulator according to claim 1, wherein:

the signal strength suppressing means is connected before the replica signal subtracting means, and the replica signal subtracting means reduces the replica signals suppressed by the signal strength suppressing means from the received signal.

3. A spread spectrum signal demodulator receiving a received signal including a plurality of spread spectrum signals, comprising:

one first interference canceller receiving the received signal and zero symbols as input signals, correctively processing the input signals in a replica signal generating means, a replica signal subtracting means, a second correlation detecting means, and a signal strength suppressing means for multiplying a suppressing factor greater than or equal "0" and less than "1" and outputting a delayed received signal and detected symbols; and one second interference canceller receiving the received signal and symbols output from the first interference canceller as input signals, correctively processing the signals in a replica signal generating means, a replica signal subtracting means, a second correlation detecting means, and a signal strength suppressing means for multiplying a suppressing factor greater than or equal "0" and less than "1", and outputting a delayed received signal and detected symbols.

4. The spread spectrum signal demodulator according to claim 1, wherein:

at least one signal strength suppressing means holds the strength of its output signal to be constant when the input signal strength exceeds a predetermined threshold strength level.

5. The spread spectrum signal demodulator according to claim 3, wherein:

at least one signal strength suppressing means holds the strength of its output signal to be constant when the input signal strength exceeds a predetermined threshold strength level.

6. The spread spectrum signal demodulator according to claim 4, wherein:

the predetermined threshold strength level is higher than a reception level of a spread spectrum signal corresponding to a signal inputted to the signal strength suppressing means.

7. The spread spectrum signal demodulator according to claim 1, which further comprises:

suppressing factor determining means for determining suppressing factors greater than or equal "0" and less than "1", which the signal strength suppressing means corresponding to respective spread spectrum signals contained in the received signal multiply by, and suppressing factor transmitting means for transmitting the suppressing factors to next signal strength suppressing means in timed relation to timings of receiving respective transmitted symbols.

8. The spread spectrum signal demodulator according to claim 7, which further comprises:

a transmission state checker for judging whether a signal to be demodulated among the spread spectrum signals contained in the received signal is interrupted and transmitting the judgement to the suppressing factor determining means, wherein the suppressing factor determining means determines suppressing factors are equal "0" when interruption.

9. The spread spectrum signal demodulator according to claim 7, which further comprises:

an inter-code interference computer for estimating correlations of the spread spectrum signals contained in the received signal and transmitting the estimated correlations to the suppressing factor determining means, wherein the suppressing factor determining means changes values of suppressing factors adaptively in response to the estimated correlations.

10. The spread spectrum signal demodulator according to claim 1, wherein:

the at least one second correlation detecting means detects correlations using matched filters and generates symbol timings on the basis of the detected correlations.

11. The spread spectrum signal demodulator according to claim 3, wherein:

the at least one second correlation detecting means detects correlations using matched filters and generates symbol timings on the basis of the detected correlations.

12. The spread spectrum signal demodulator according to claim 10, wherein:

the replica signal generating means each re-spreads input symbols with spreading codes by using symbol timings generated by one of the first or second correlation detecting means constituted by matched filers, that is located at a position closest to the replica signal generating means.

13. The spread spectrum signal demodulator according to claim 1, wherein:

second correlation detecting means of a present stage of correlation are equal or greater in number than the number of the first or second correlation detecting means of a preceding stage of correlation.

14. The spread spectrum signal demodulator according to claim 3, wherein:

second correlation detecting means of present stage of correlation are equal or greater in number than the number of the first or second correlation detecting means of a preceding stage of correlation.

15. The spread spectrum signal demodulator according to claim 1, wherein a plurality of interference cancellers are provided and are connected one after another, and which further comprises:

at least one received power measuring means for measuring receive power levels of the spread spectrum signals contained in the received signal;

a value of the suppressing factor being determined according to the received power levels measured in the received power measuring means.

16. The spread spectrum signal demodulator according to claim 3, wherein a plurality of interference cancellers are provided and are connected one after another, and which further comprises:

at least one received power measuring means for measuring receive power levels of the spread spectrum signals contained in the received signal;

a value of the suppressing factor being determined according to the received power levels measured in the received power measuring means.

17. The spread spectrum signal demodulator according to claim 1, wherein:

one of the replica signals and correlation signals are subjected to a process equivalent to bandwidth limiting of signal waveforms set on the transmitting and receiving sides.

18. The spread spectrum signal demodulator according to claim 3, wherein:

one of the replica signals and correlation signals are subjected to a process equivalent to bandwidth limiting of signal waveforms set on the transmitting and receiving sides.

* * * * *